(12) United States Patent
Kim

(10) Patent No.: US 11,088,450 B2
(45) Date of Patent: Aug. 10, 2021

(54) ANTENNA MODULE FOR NEAR FIELD COMMUNICATION

(71) Applicant: AMOTECH CO., LTD., Incheon (KR)

(72) Inventor: Beom-Jin Kim, Bucheon-si (KR)

(73) Assignee: AMOTECH CO., LTD., Incheon (KR)

( * ) Notice: Subject to any disclaimer, the term of this patent is extended or adjusted under 35 U.S.C. 154(b) by 69 days.

(21) Appl. No.: 16/325,153

(22) PCT Filed: Aug. 16, 2017

(86) PCT No.: PCT/KR2017/008875
§ 371 (c)(1),
(2) Date: Feb. 12, 2019

(87) PCT Pub. No.: WO2018/034483
PCT Pub. Date: Feb. 22, 2018

(65) Prior Publication Data
US 2019/0173182 A1 Jun. 6, 2019

(30) Foreign Application Priority Data

Aug. 16, 2016 (KR) .................. 10-2016-0103525
Aug. 16, 2016 (KR) .................. 10-2016-0103526

(51) Int. Cl.
*H01Q 7/06* (2006.01)
*H01Q 5/50* (2015.01)
(Continued)

(52) U.S. Cl.
CPC .............. *H01Q 7/06* (2013.01); *H01F 5/003* (2013.01); *H01F 27/255* (2013.01); *H01Q 1/22* (2013.01);
(Continued)

(58) Field of Classification Search
CPC .. H01Q 7/06; H01Q 1/22; H01Q 1/38; H01Q 5/50; H01F 27/255; H01F 5/003; H04B 5/0031
(Continued)

(56) References Cited

U.S. PATENT DOCUMENTS 8,159,405 B2 * 4/2012 Kimura .................. H05K 1/165
343/788
10,020,582 B2 7/2018 Tsubaki et al.
(Continued)

FOREIGN PATENT DOCUMENTS

CN 103620869 A 3/2014
CN 103633421 A * 3/2014
(Continued)

*Primary Examiner* — Alexander H Taningco
*Assistant Examiner* — Amy X Yang
(74) *Attorney, Agent, or Firm* — CL Intellectual LLC

(57) ABSTRACT

Disclosed is an antenna module for near field communication, which stacks laminates on which a vertical winding radiation pattern and a horizontal winding radiation pattern are formed, respectively, thereby improving communication performance on the side surface and one surface of a portable terminal while minimizing a mounting space. The disclosed antenna module for near field communication includes a first magnetic member; a vertical winding radiation pattern winding the outer circumference of the first magnetic member; a second magnetic member stacked on the lower surface of the first magnetic member; a horizontal winding radiation pattern formed on one surface of the second magnetic member; a dielectric stacked on the lower surface of the second magnetic member; and a terminal portion formed on the dielectric to be connected to at least one of the vertical winding radiation pattern and the horizontal winding radiation pattern.

15 Claims, 24 Drawing Sheets

(51) Int. Cl.
  *H01Q 1/22* (2006.01)
  *H01Q 1/38* (2006.01)
  *H01F 27/255* (2006.01)
  *H01F 5/00* (2006.01)
  *H01F 27/28* (2006.01)

(52) U.S. Cl.
  CPC ................ *H01Q 1/38* (2013.01); *H01Q 5/50* (2015.01); *H01F 2027/2809* (2013.01)

(58) Field of Classification Search
  USPC ........................................................ 343/702
  See application file for complete search history.

(56) References Cited

U.S. PATENT DOCUMENTS

| | | | |
|---|---|---|---|
| 10,566,947 B2* | 2/2020 | Kim | ................... H03H 7/0115 |
| 10,923,802 B2* | 2/2021 | Kim | ........................ H01Q 7/00 |
| 2013/0135165 A1* | 5/2013 | Yamaguchi | .............. H01Q 7/06 |
| | | | 343/788 |
| 2014/0253404 A1 | 9/2014 | Ikemoto et al. | |

FOREIGN PATENT DOCUMENTS

| | | | | |
|---|---|---|---|---|
| CN | 104025463 | A | | 9/2014 |
| CN | 105490009 | A | * | 4/2016 |
| CN | 105490009 | A | | 4/2016 |
| JP | 2012-44592 | A | | 3/2012 |
| JP | 2012044592 | A | * | 3/2012 |
| JP | 2014-154896 | A | | 8/2014 |
| JP | 2014154896 | A | * | 8/2014 |
| KR | 10-0770904 | A | | 10/2007 |
| KR | 10-2010-0010661 | A | | 2/2010 |
| KR | 10-2011-0043249 | A | | 4/2011 |

\* cited by examiner

[FIG. 1]
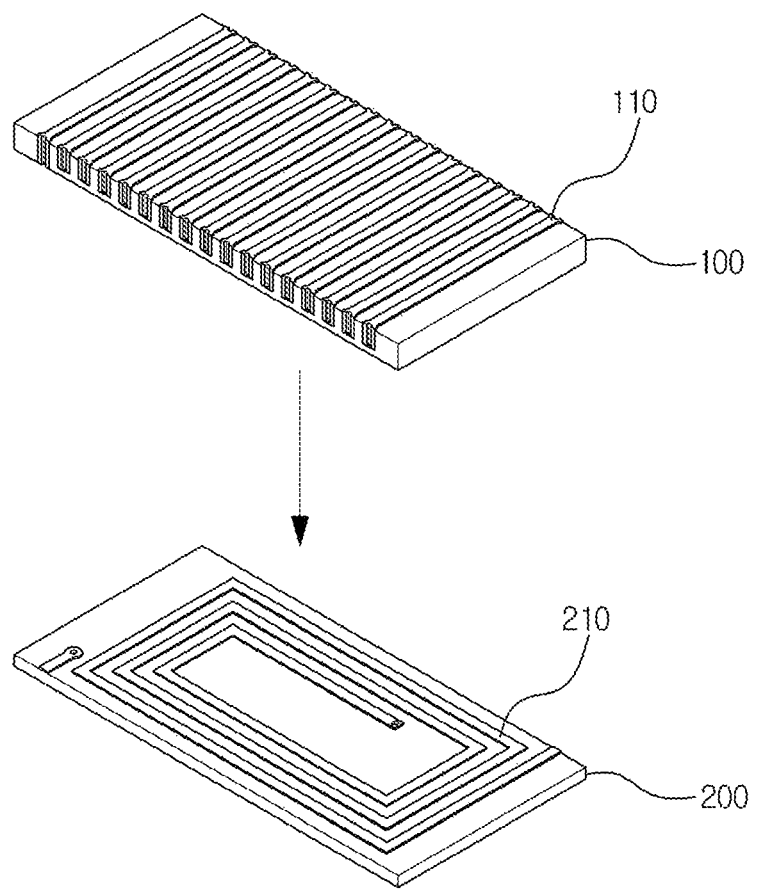

[FIG. 2]
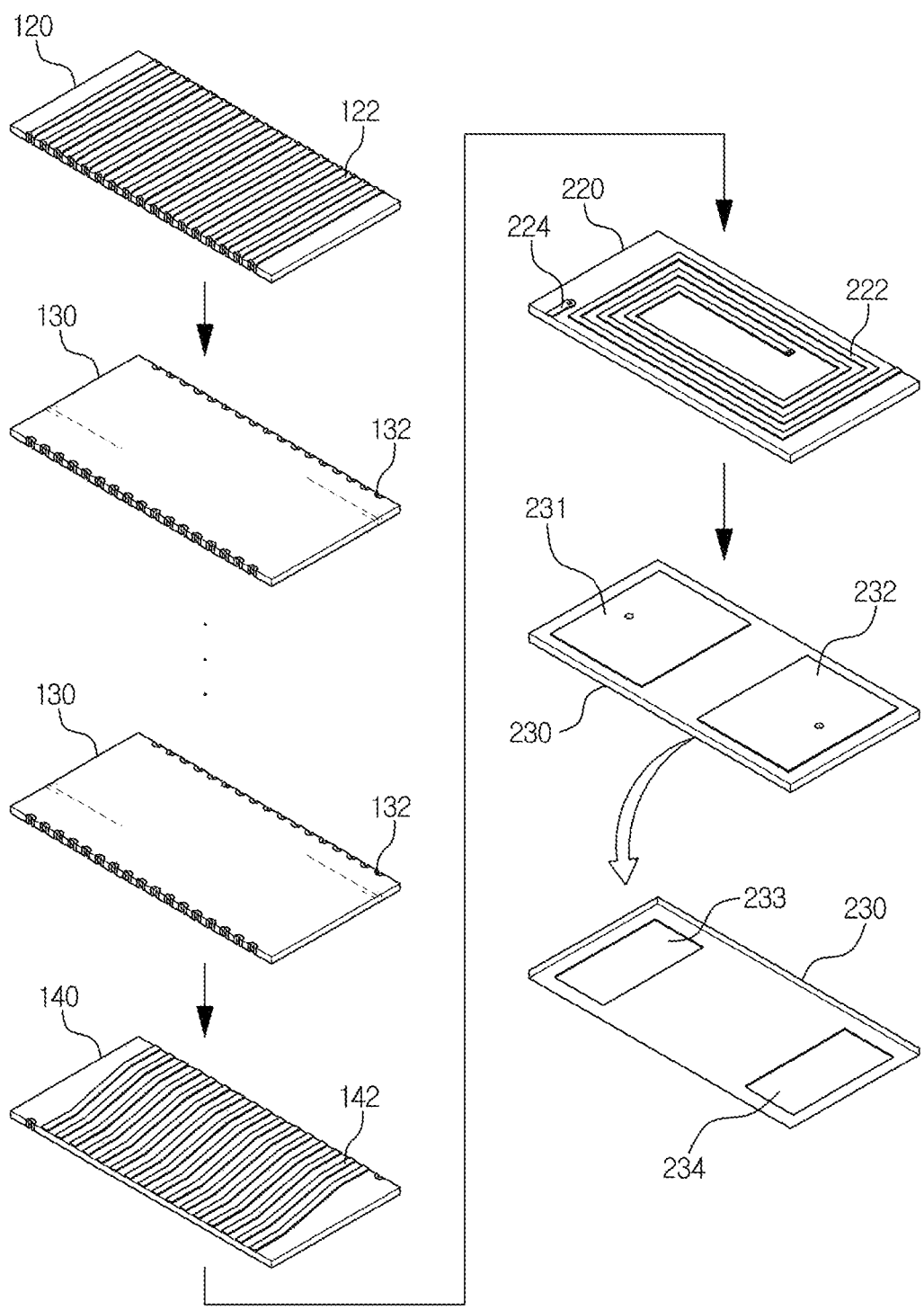

[FIG. 3]
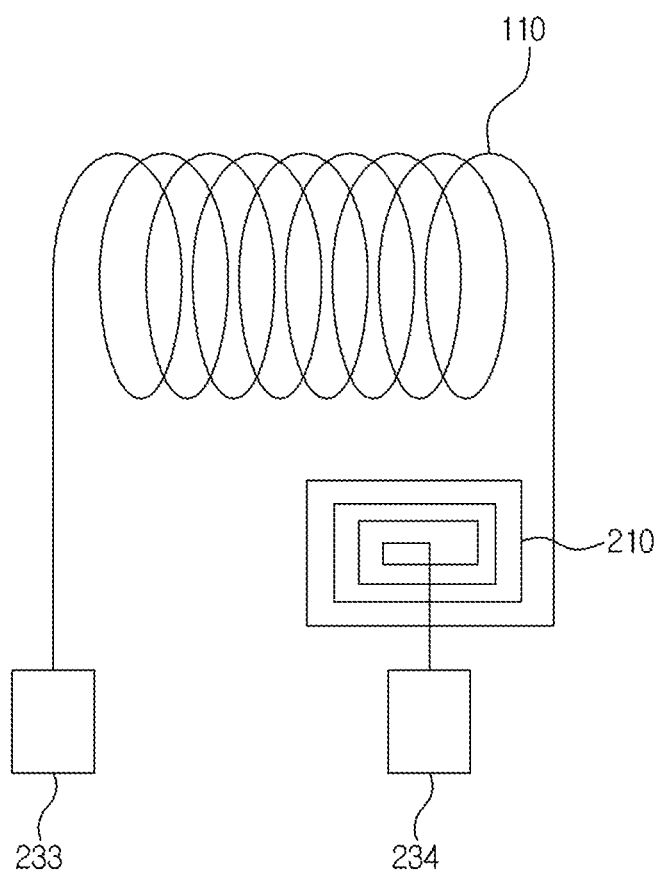

[FIG. 4]
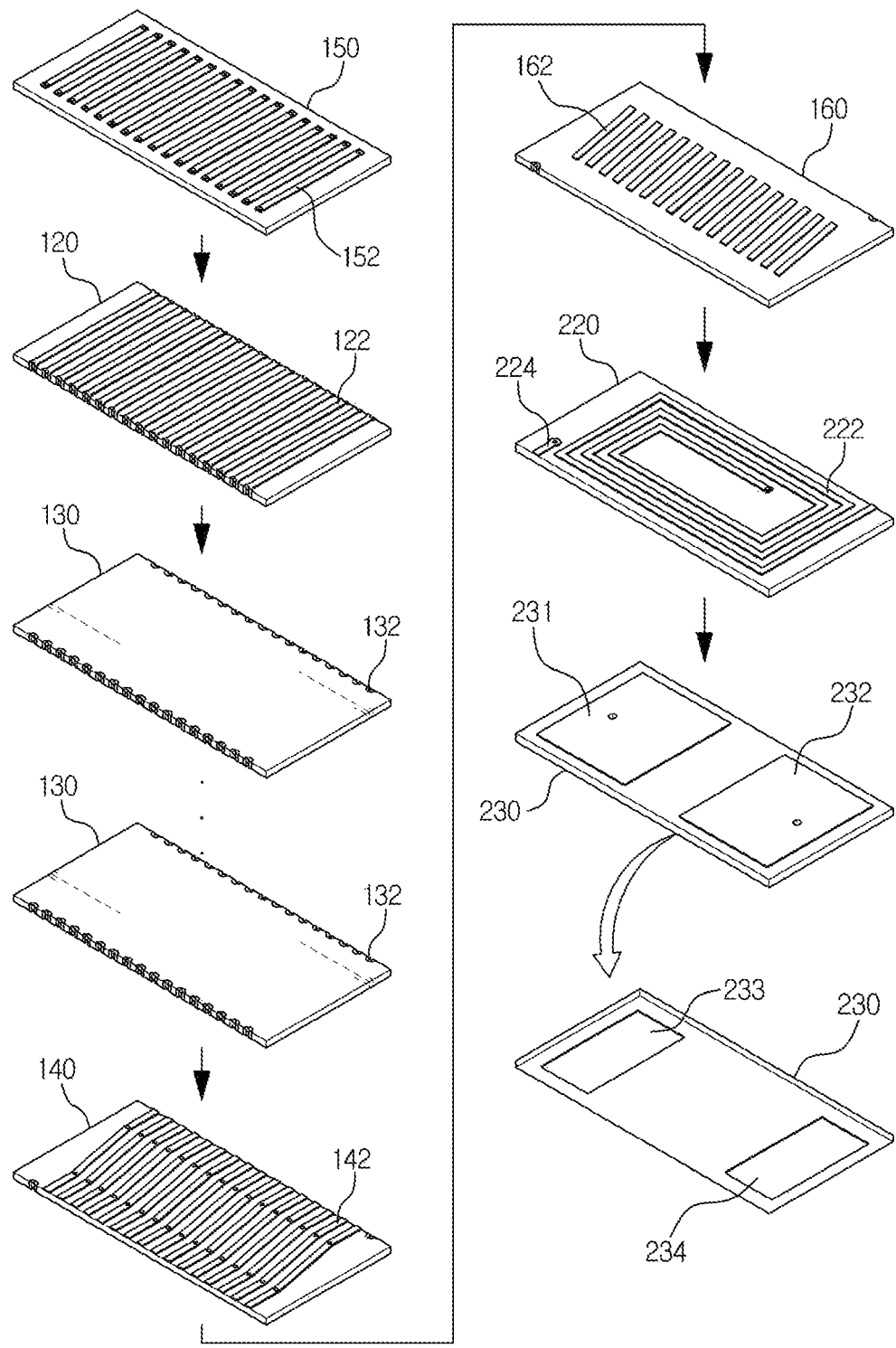

[FIG. 5]
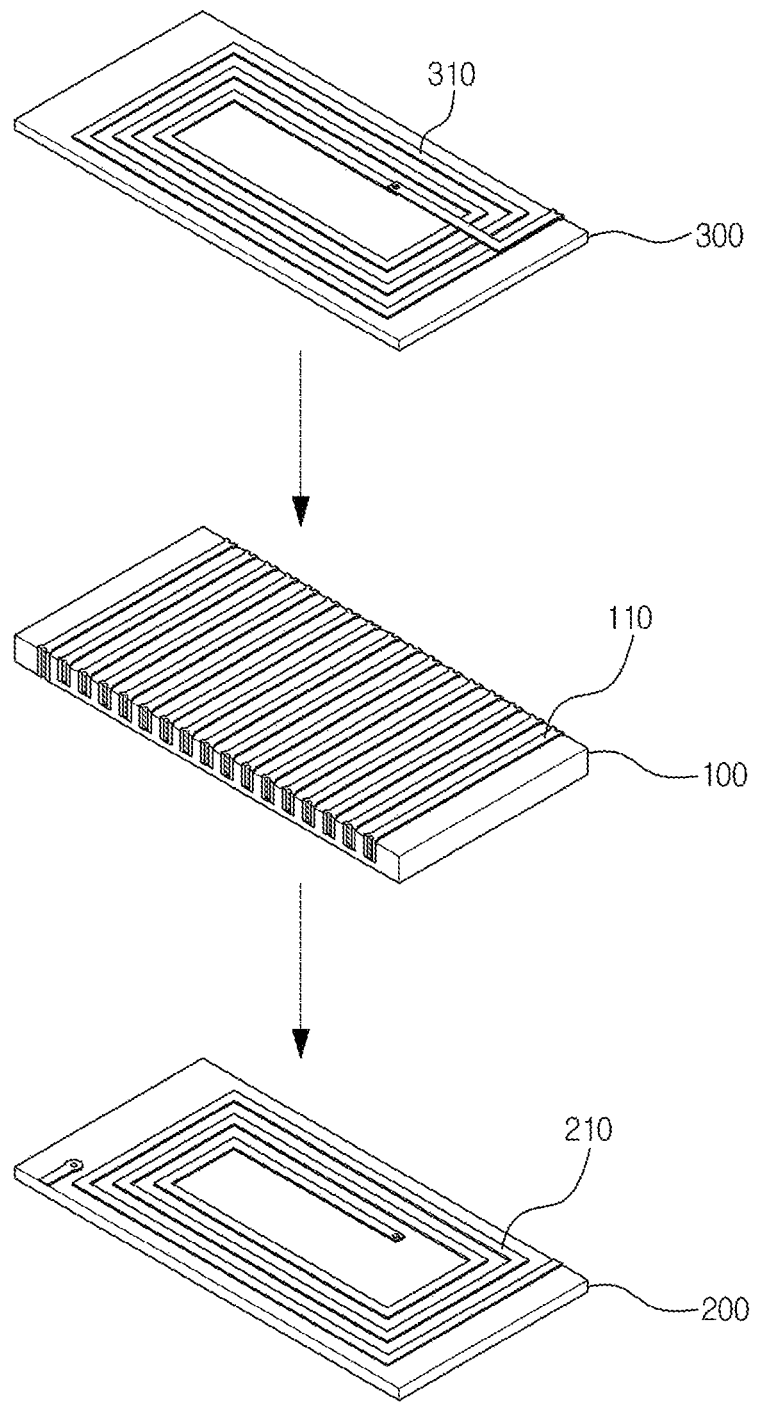

[FIG. 6]
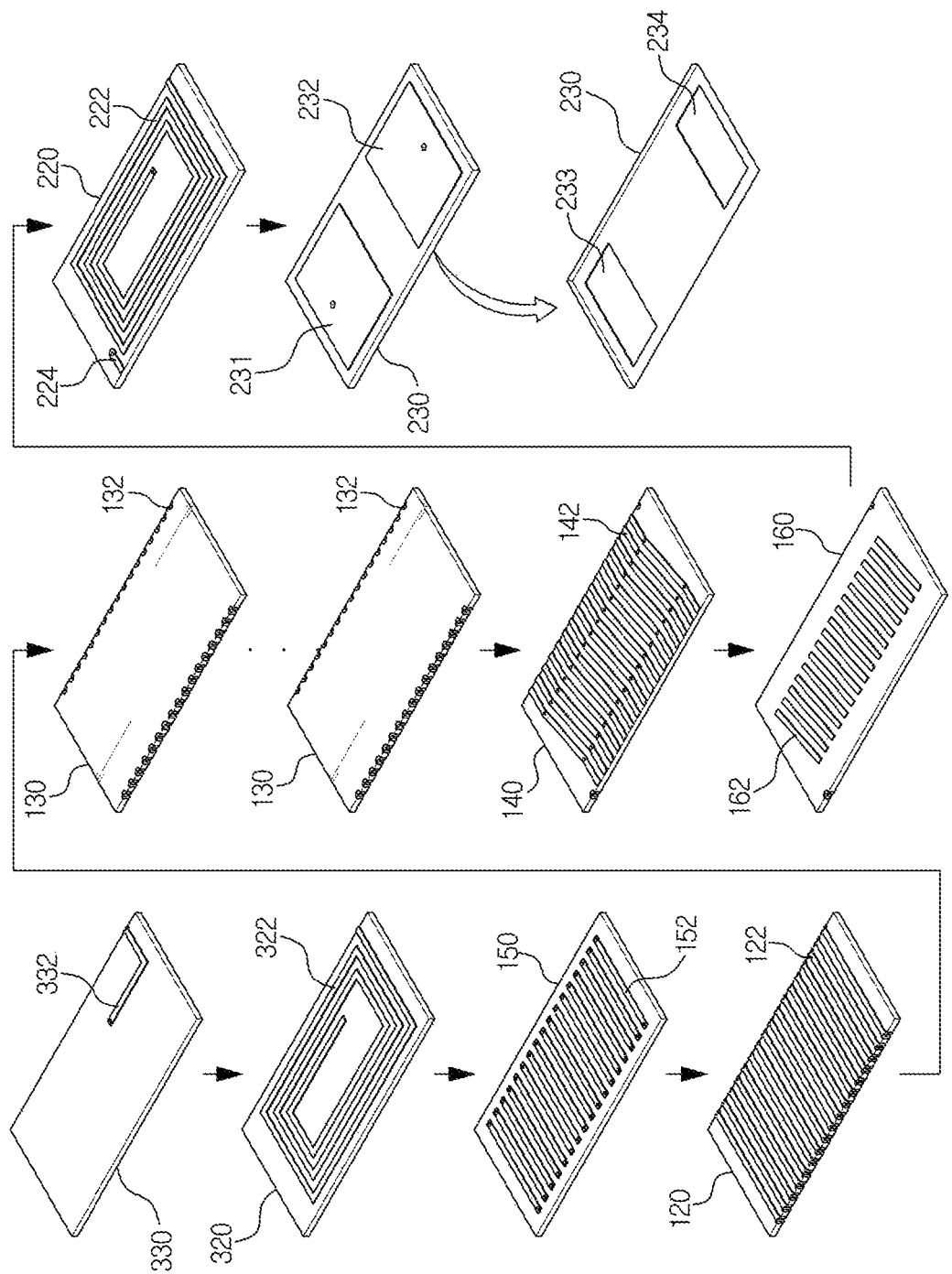

[FIG. 7]
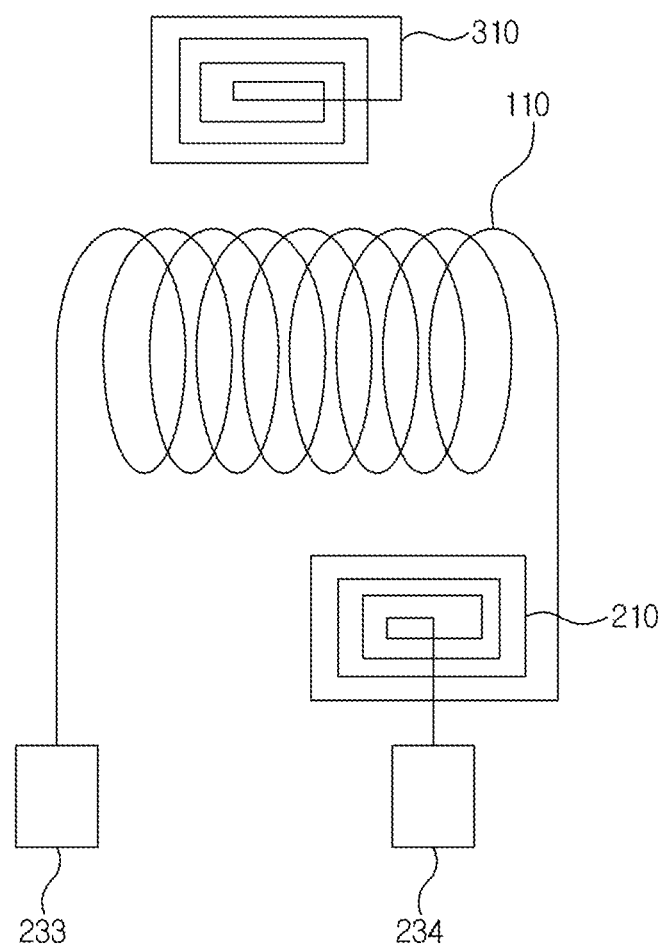

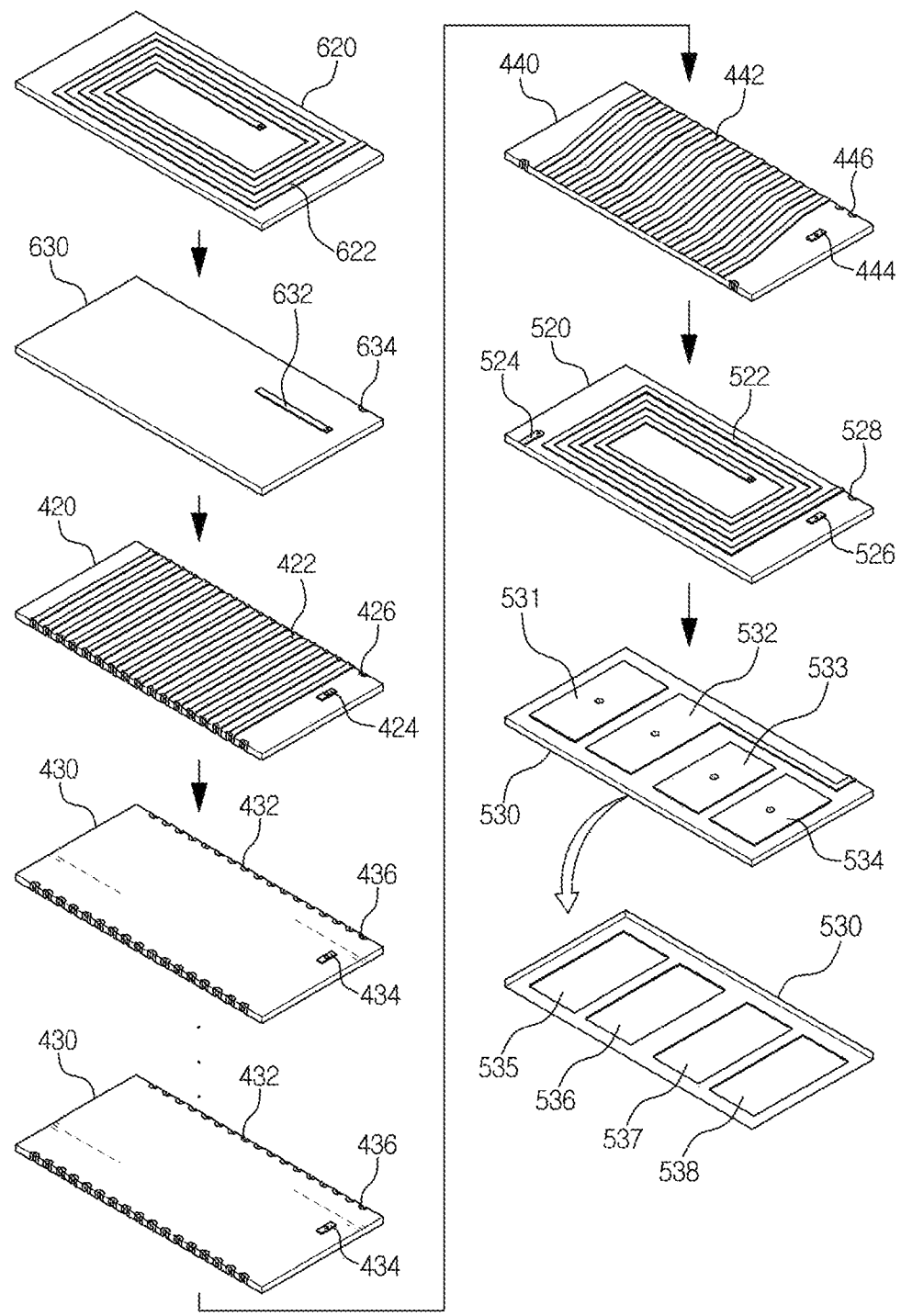
[FIG. 8]

[FIG. 9]
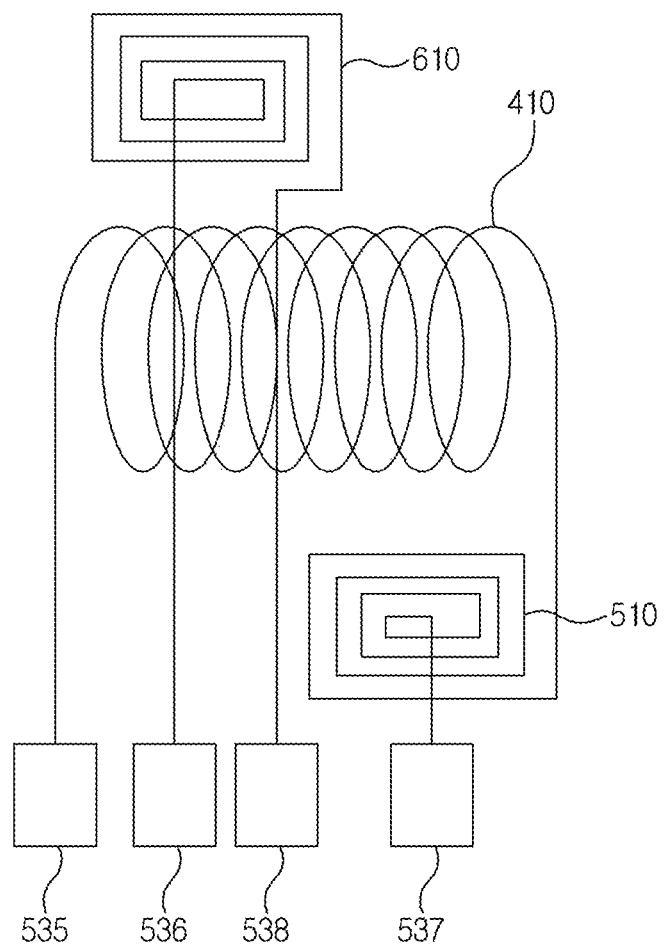

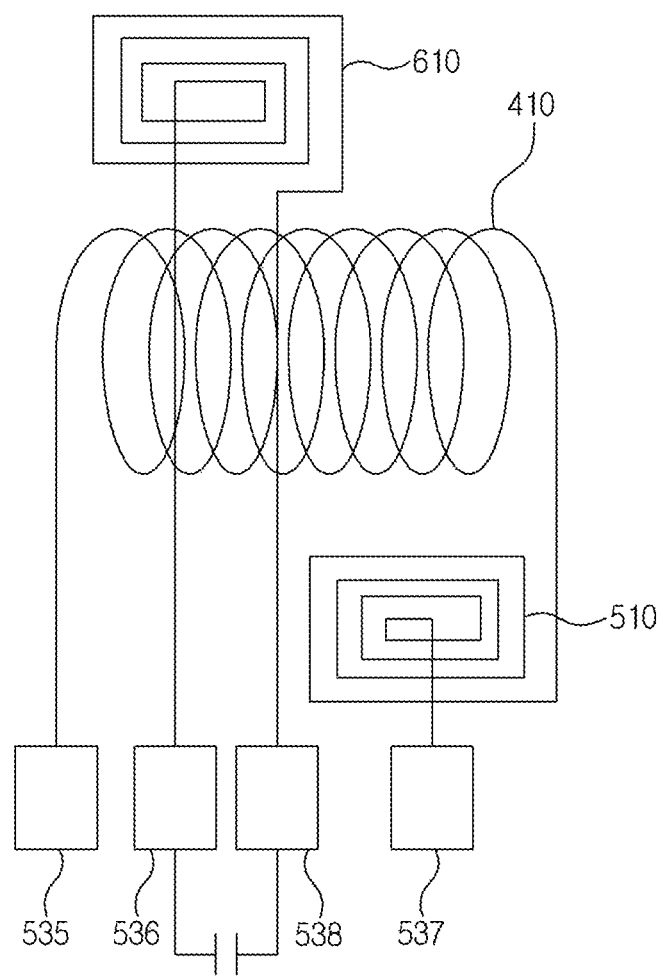
[FIG. 10]

[FIG. 11]
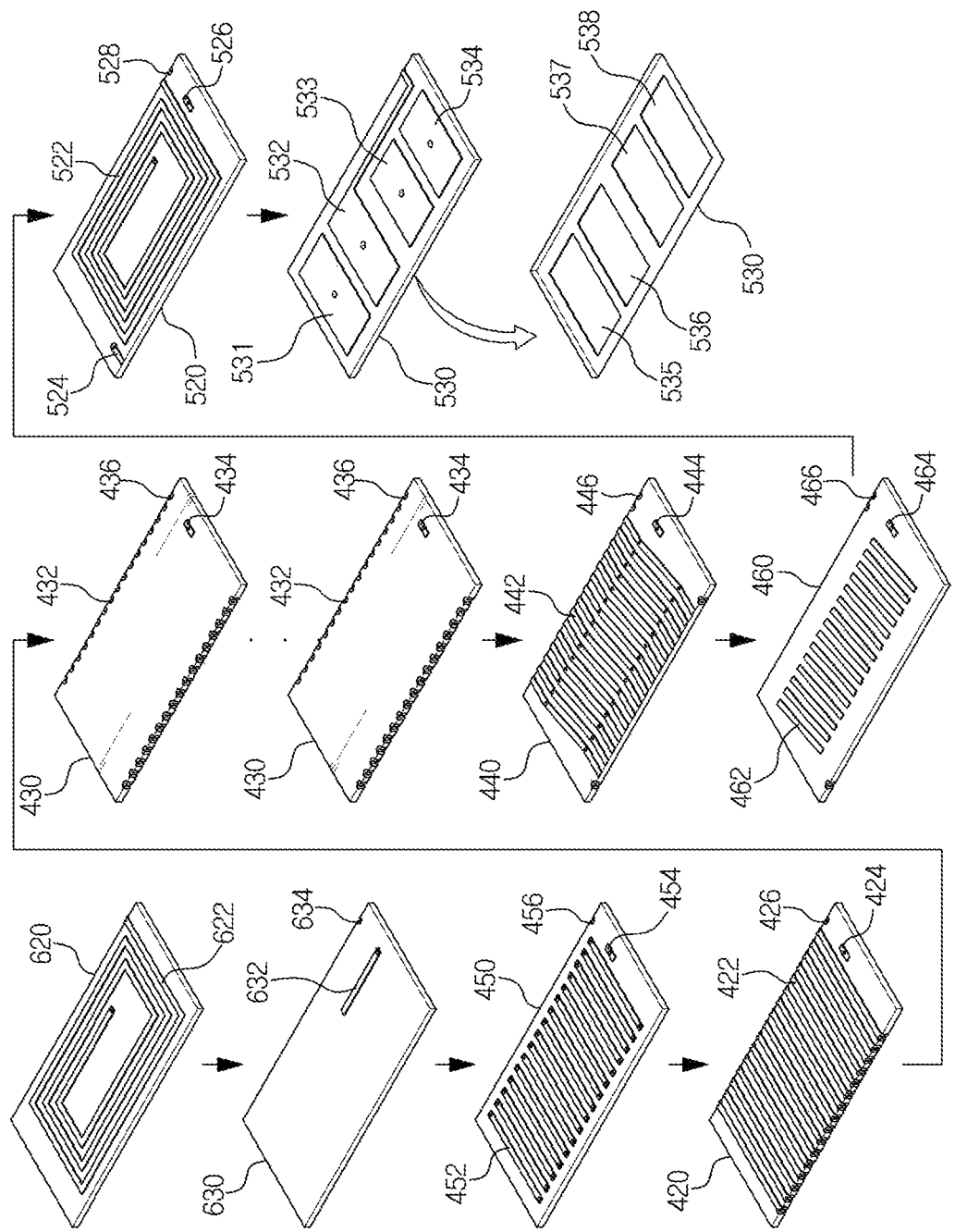

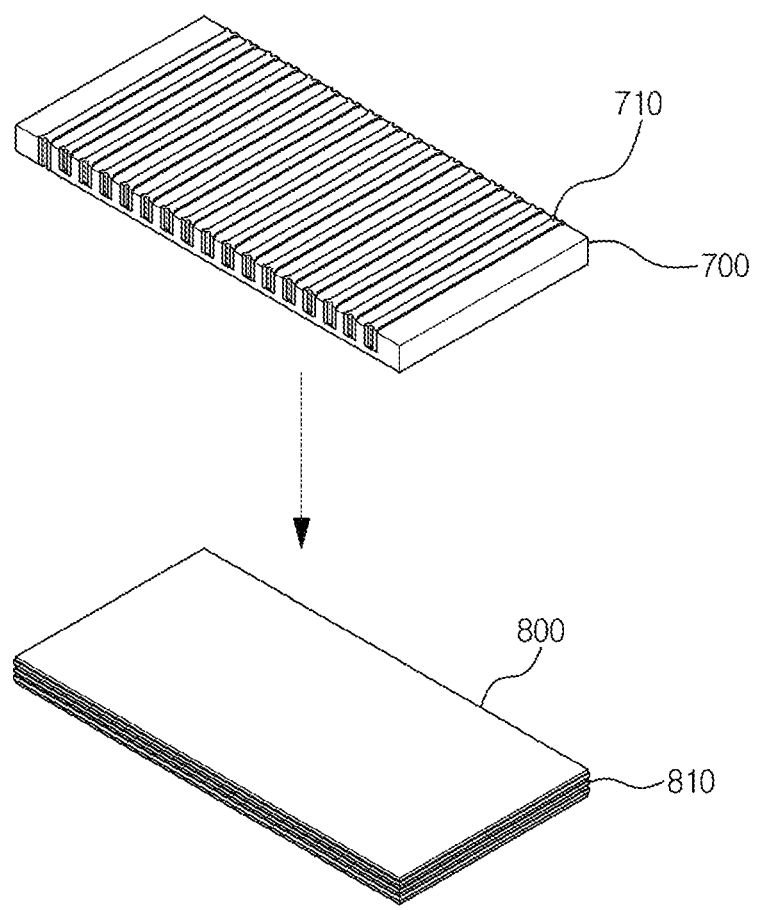
[FIG. 12]

[FIG. 13]
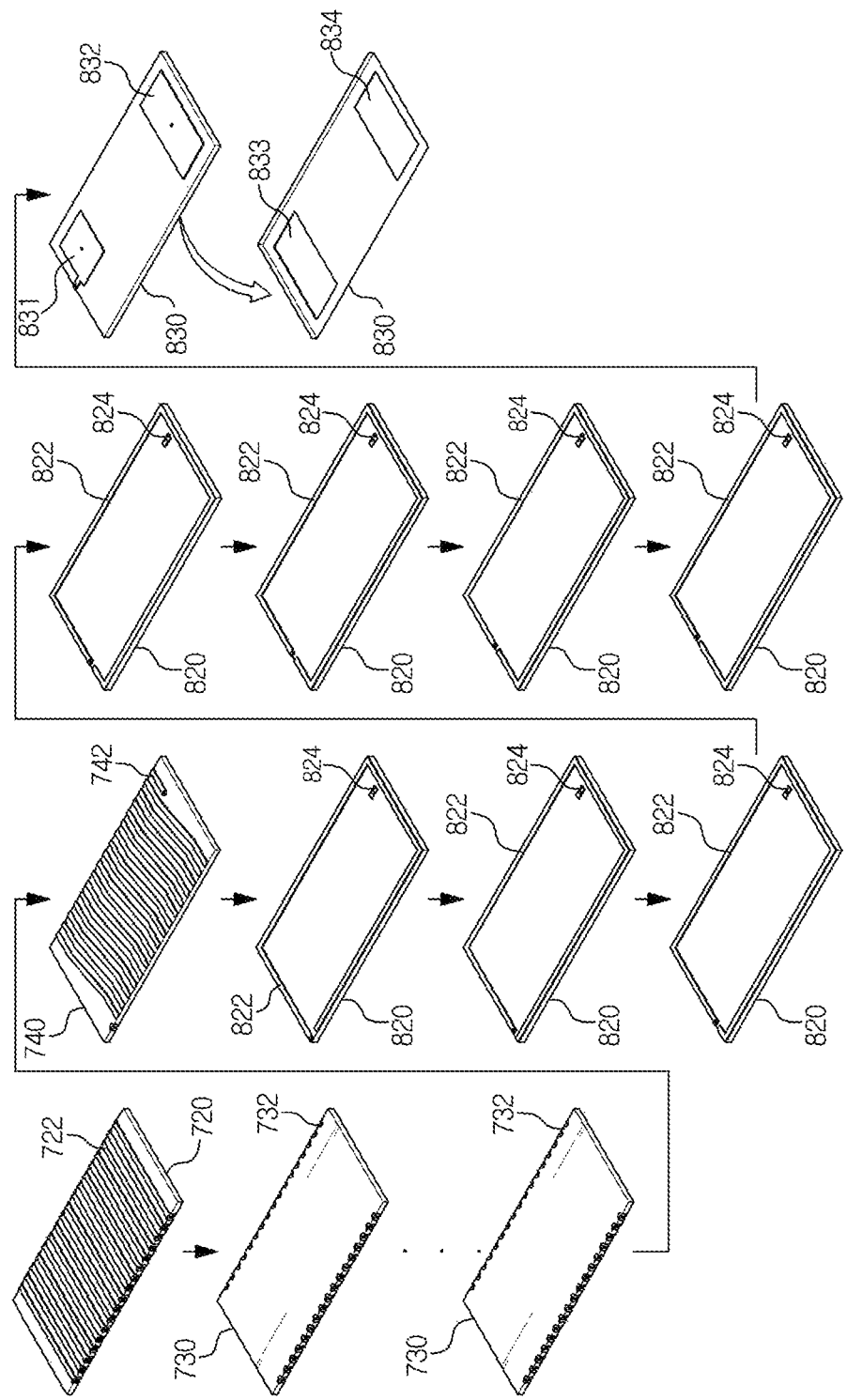

[FIG. 14]
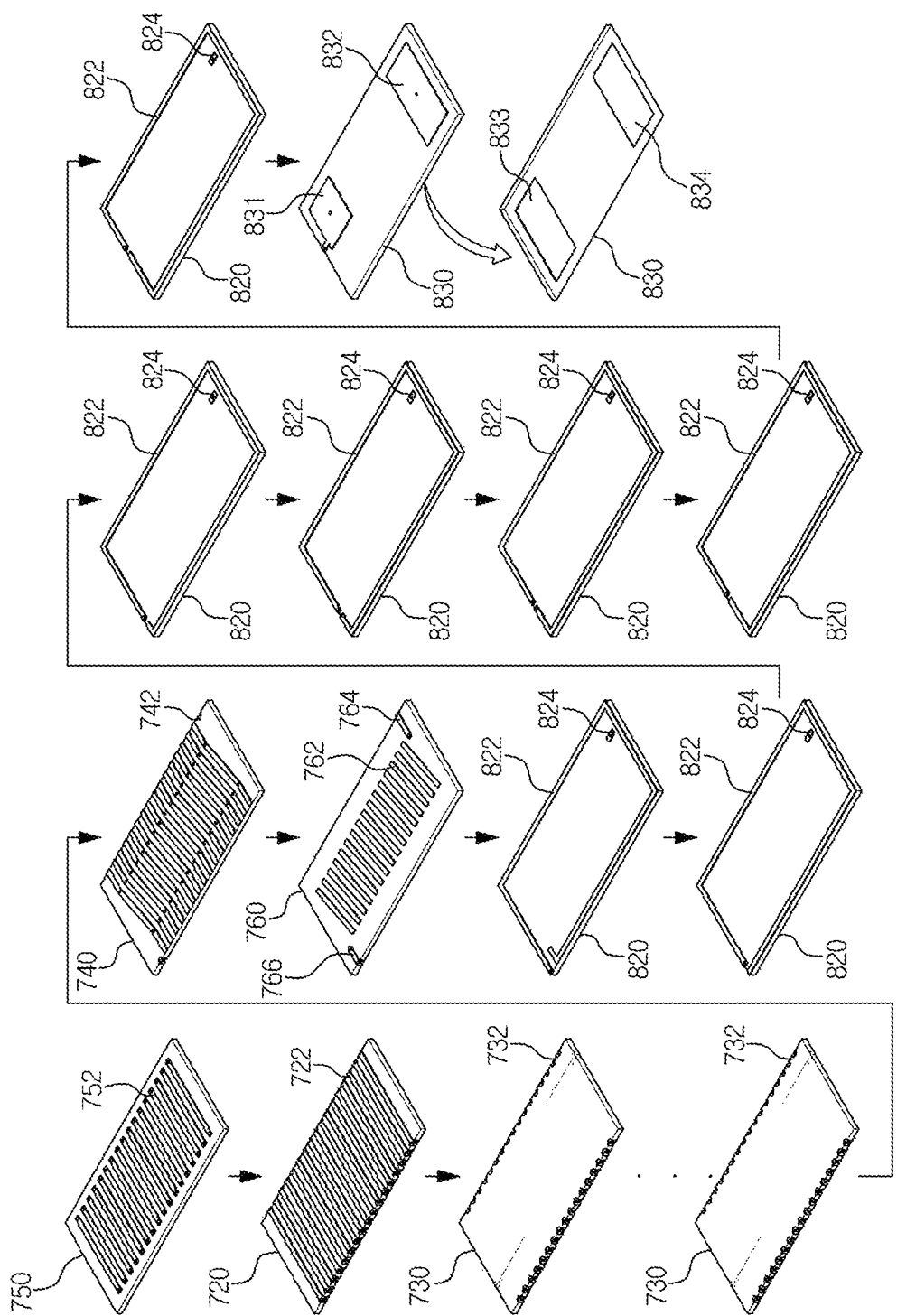

[FIG. 15]
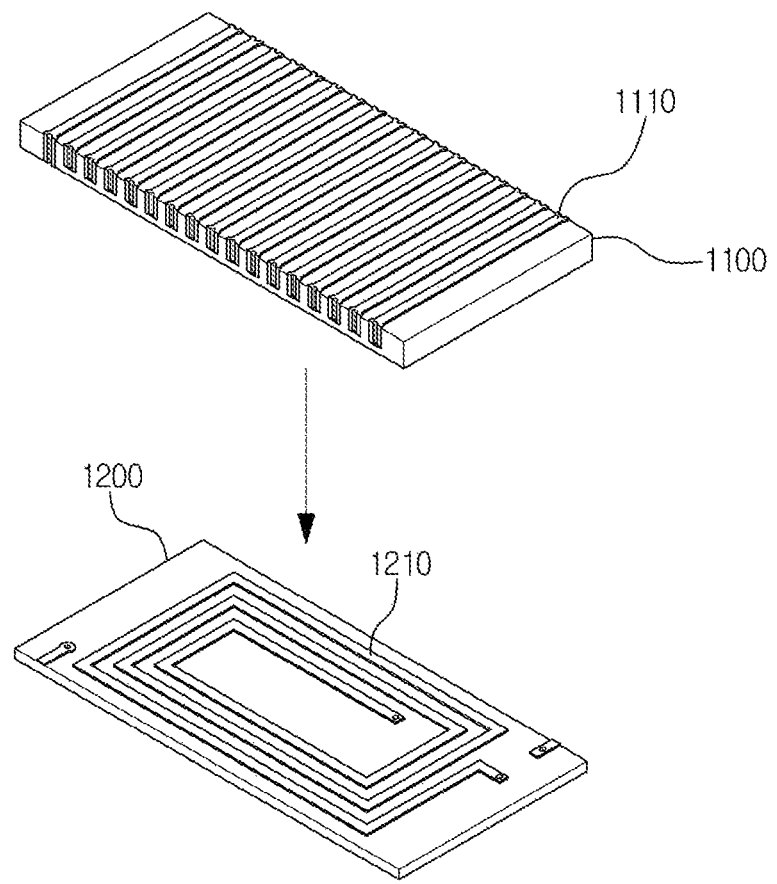

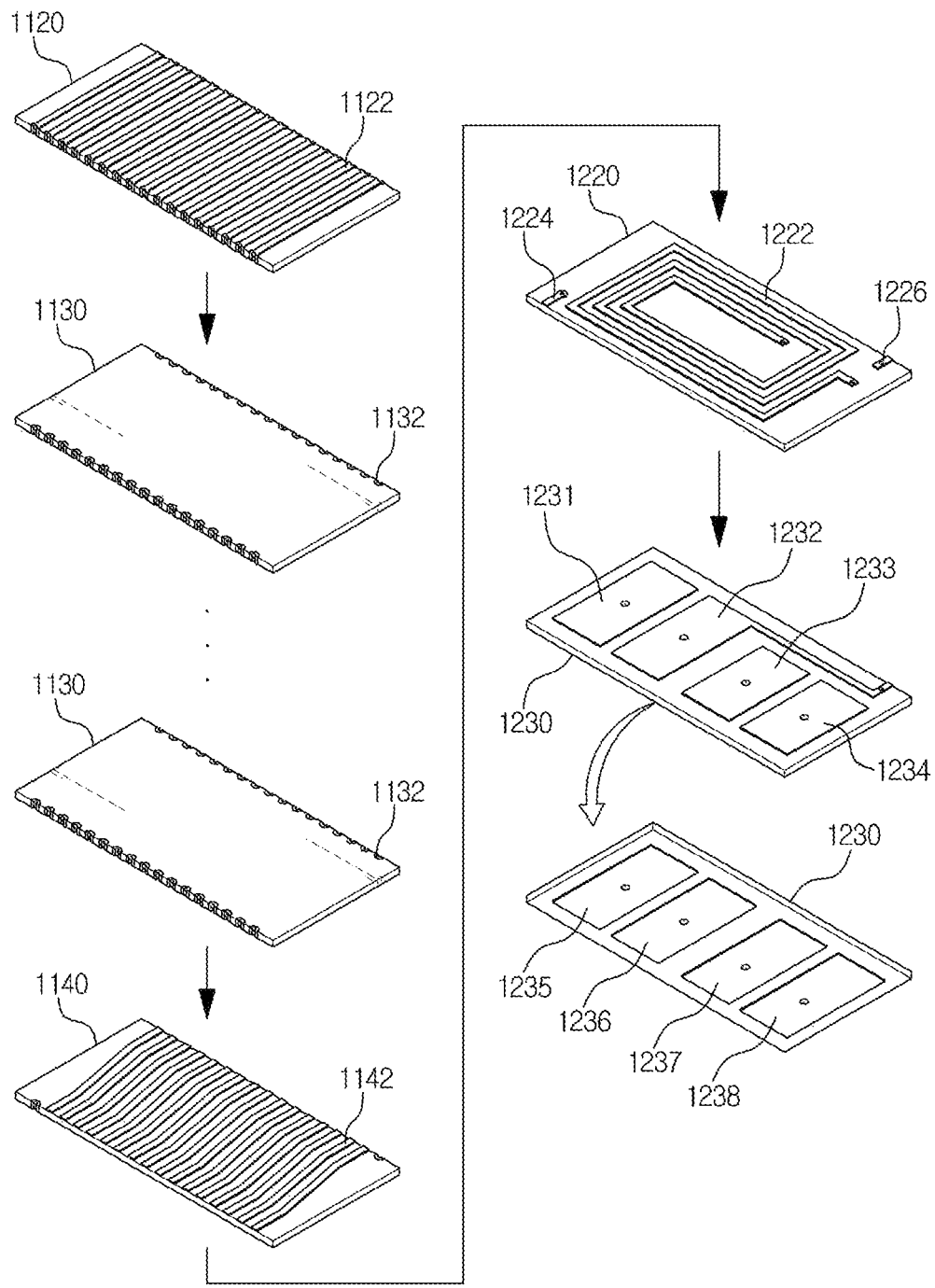
[FIG. 16]

[FIG. 17]
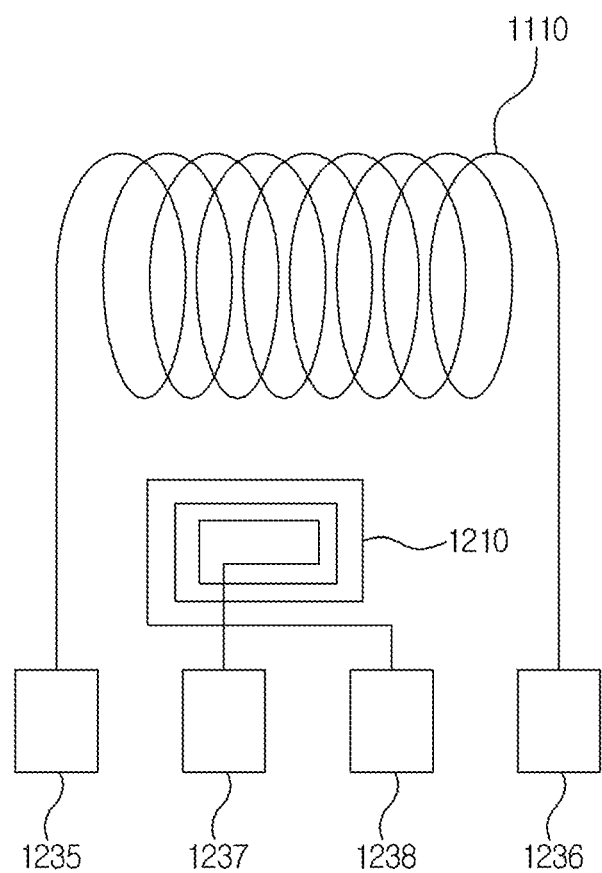

[FIG. 18]
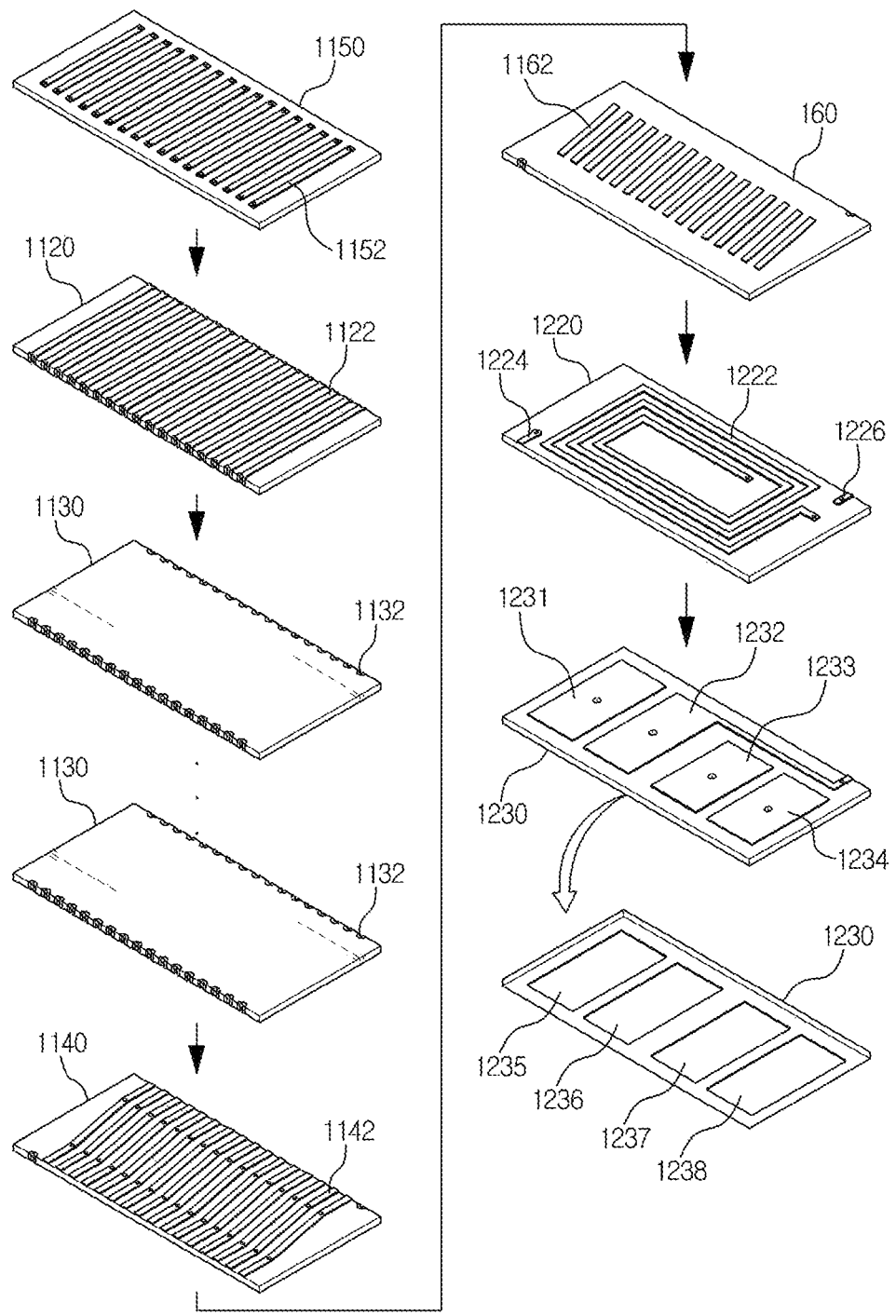

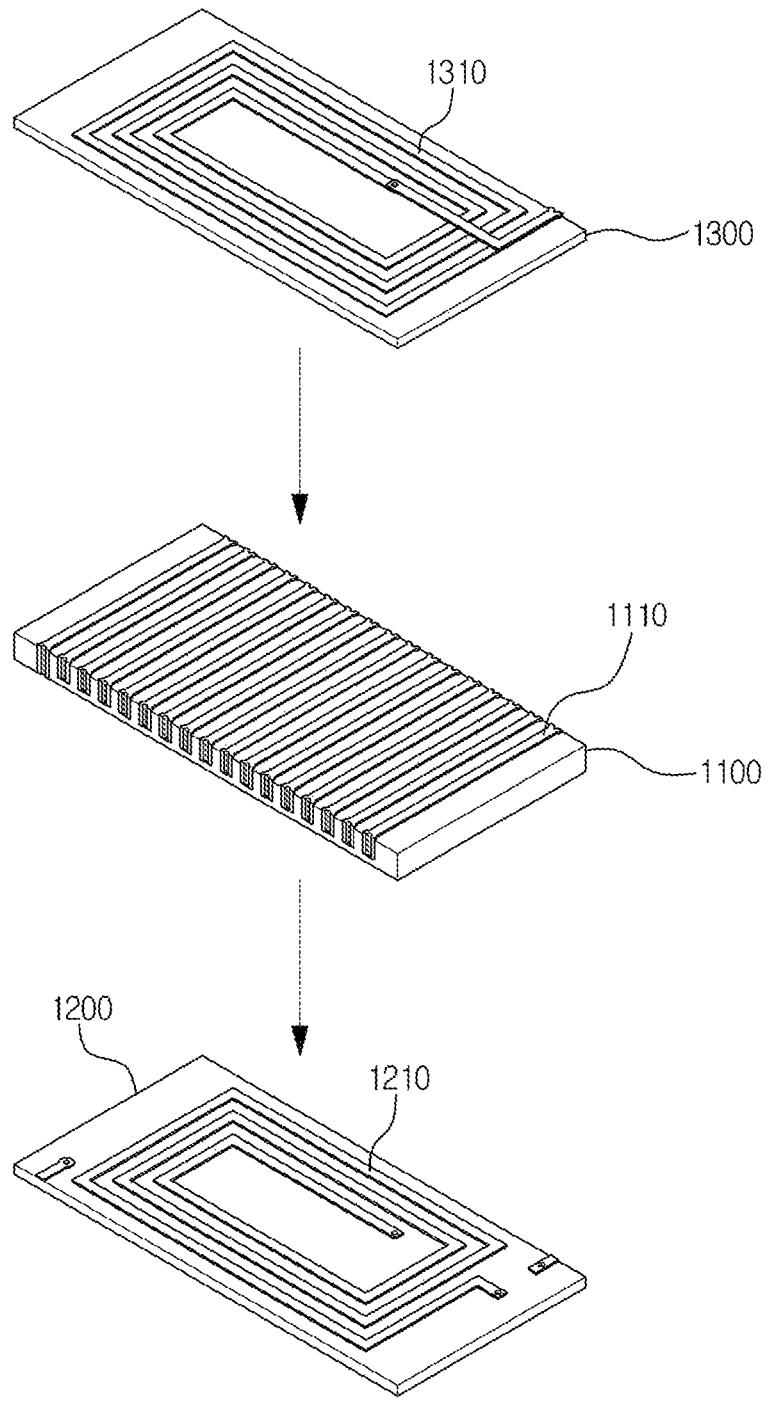
[FIG. 19]

[FIG. 20]
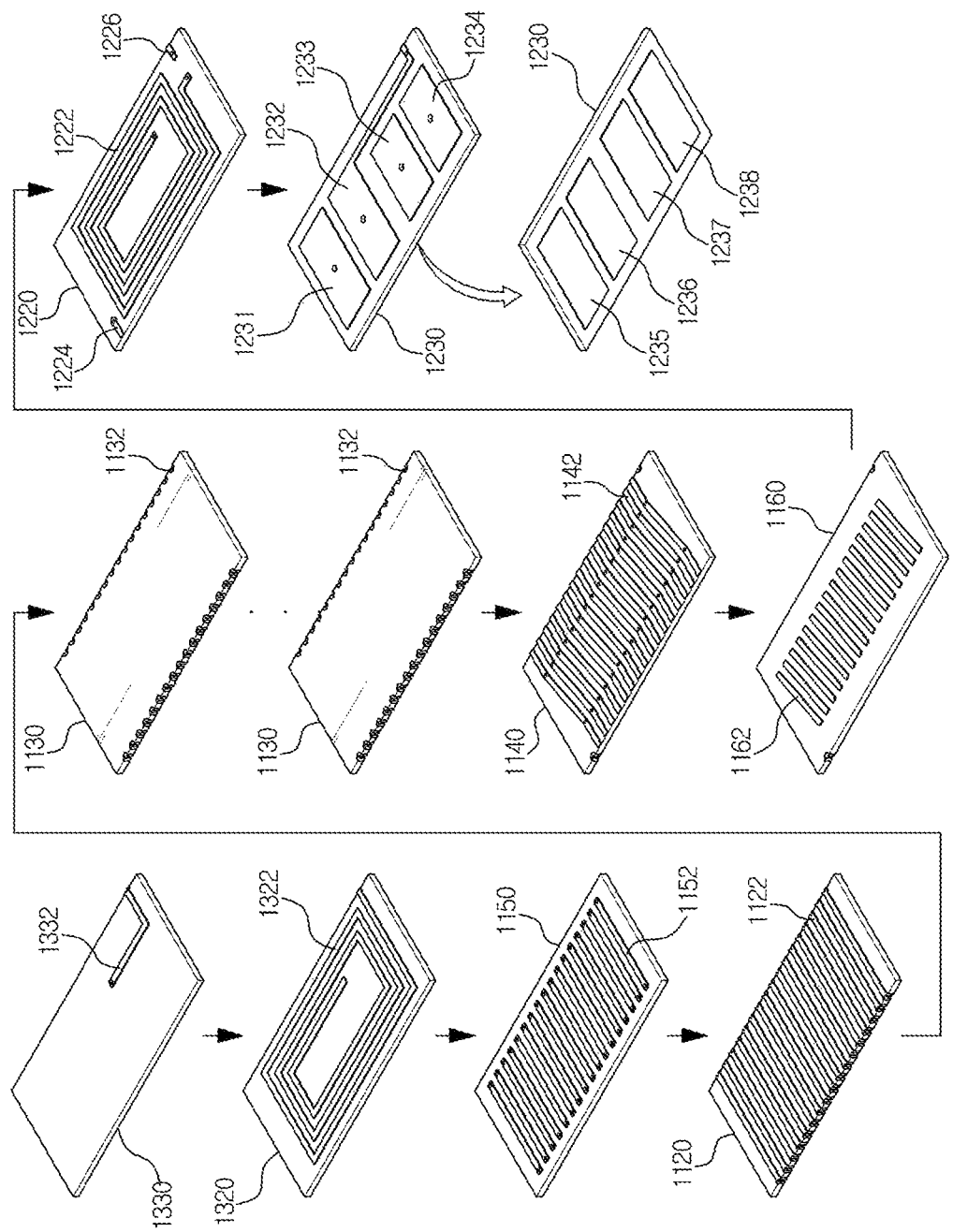

[FIG. 21]
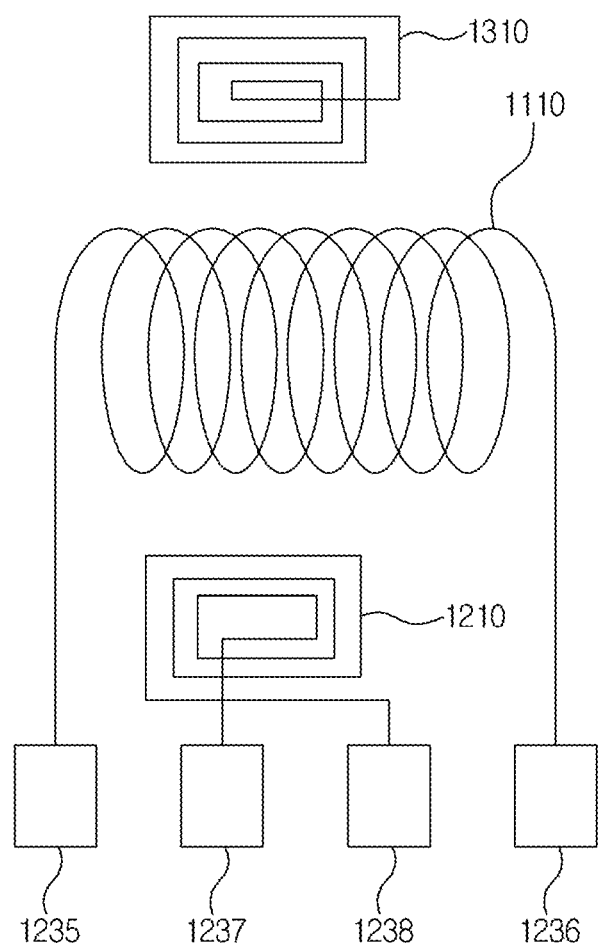

[FIG. 22]
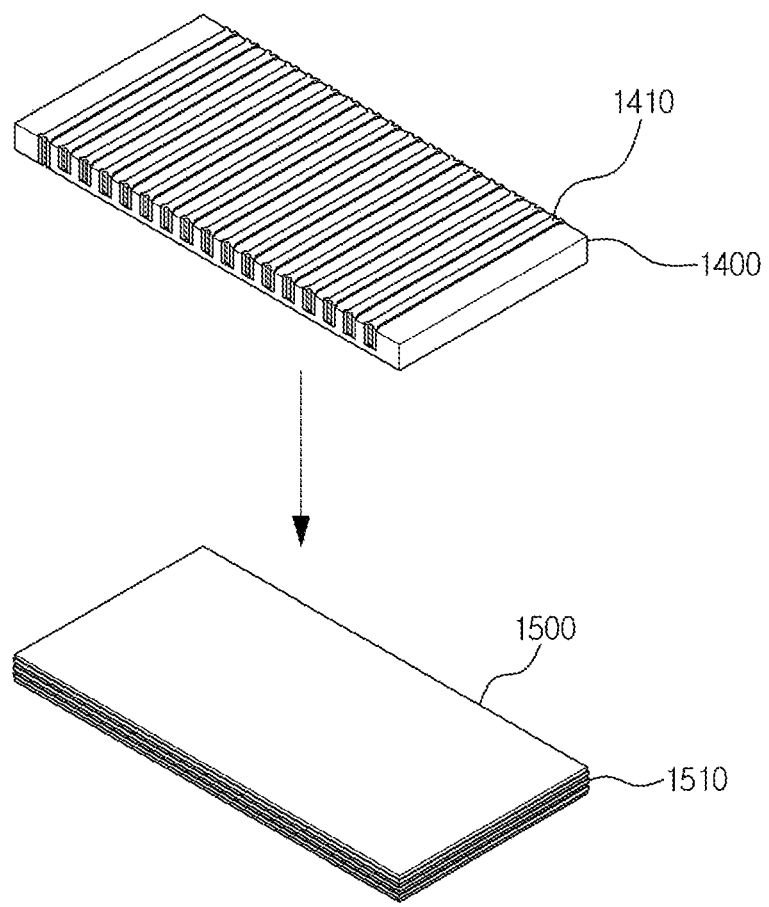

[FIG. 23]
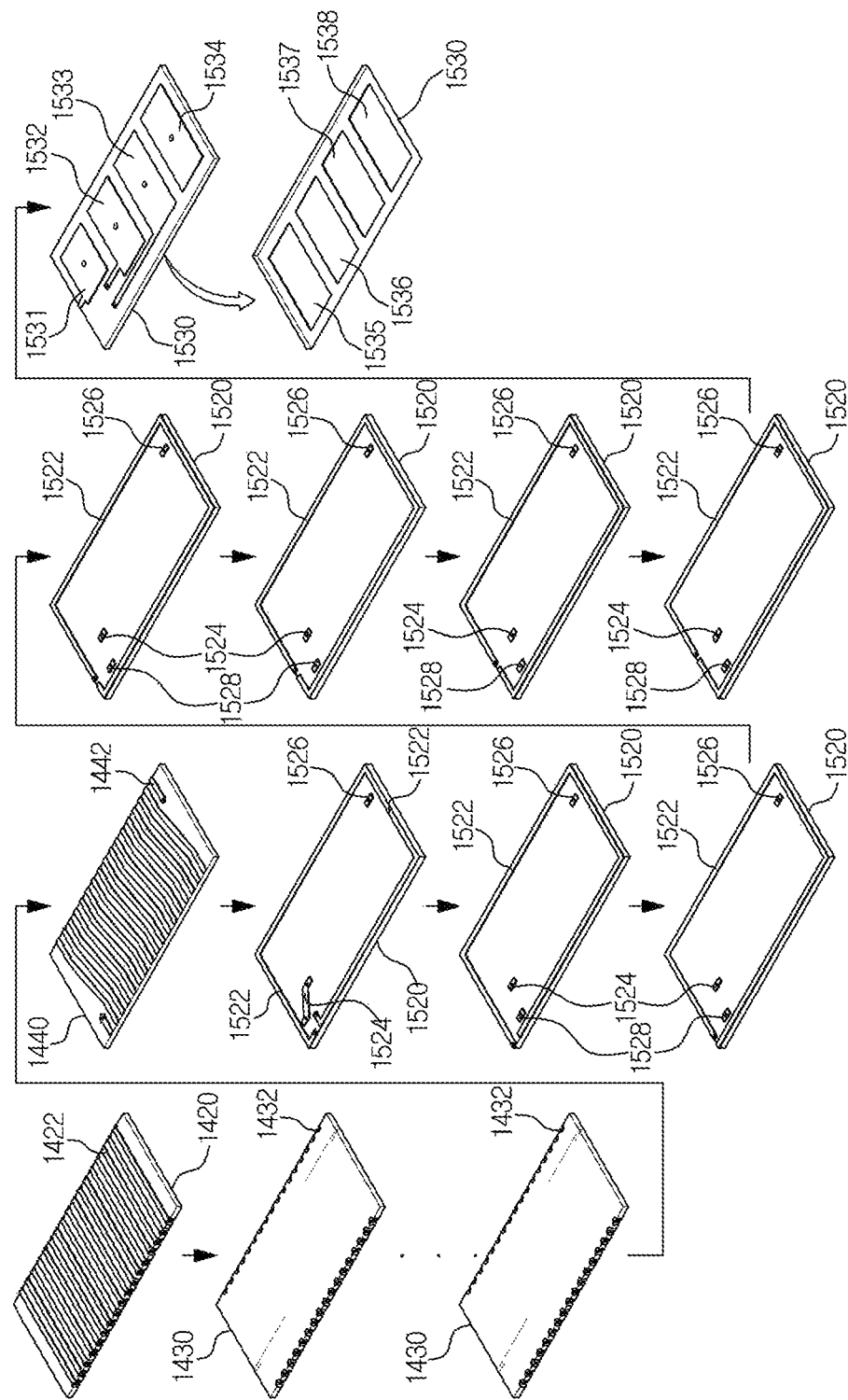

[FIG. 24]
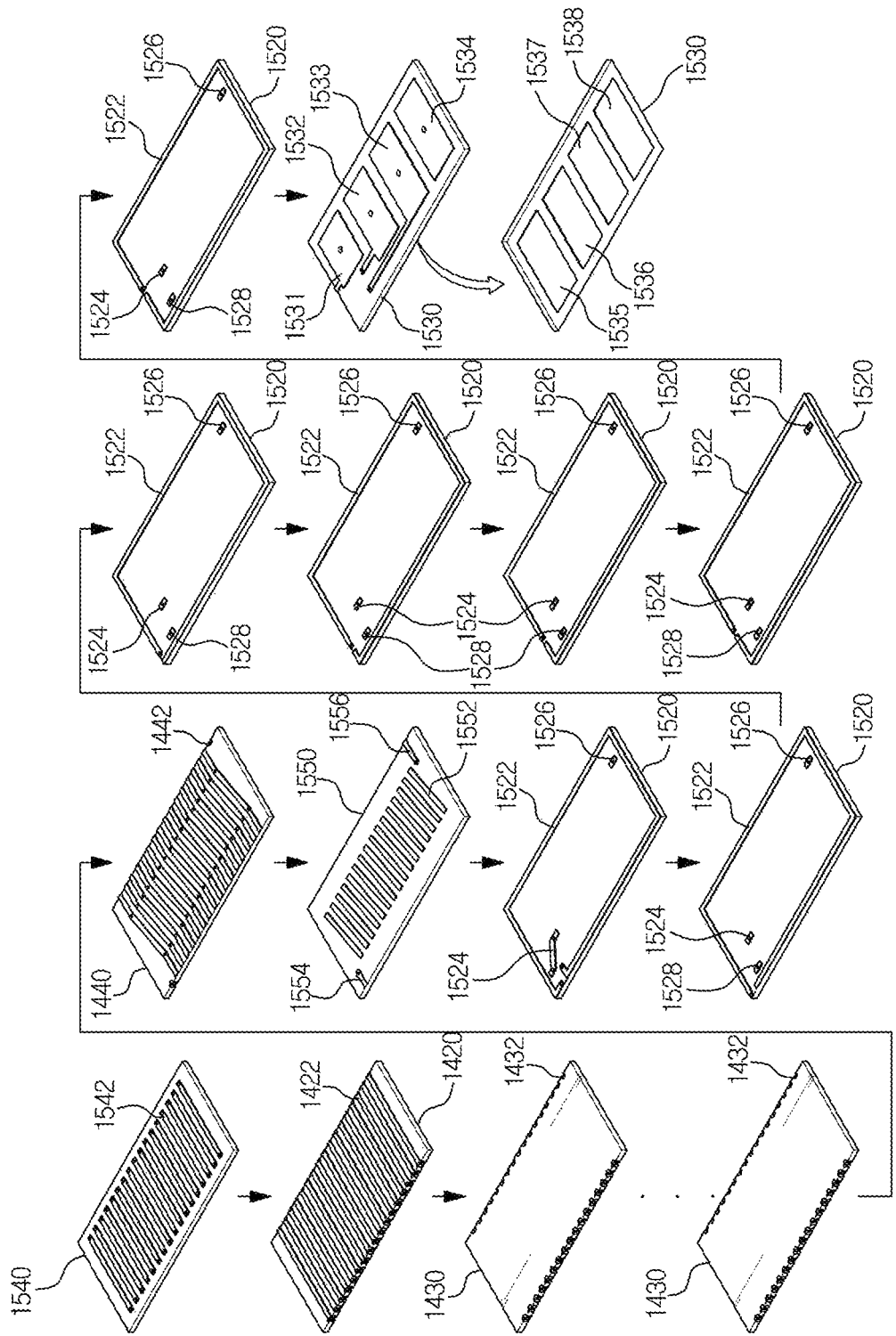

ANTENNA MODULE FOR NEAR FIELD COMMUNICATION

CROSS-REFERENCE TO RELATED APPLICATIONS

This application is a National Stage of International patent application PCT/KR2017/008875, filed on Aug. 16, 2017, which claims priority to foreign Korean patent application Nos. KR 10-2016-0103525 and KR 10-2016-0103526 filed on Aug. 16, 2016, the disclosures of which are incorporated by reference in their entireties.

FIELD OF THE INVENTION

The present disclosure relates to an antenna module for near field communication, and more particularly, to an antenna module for near field communication, which is built in a small portable terminal such as a smart watch and performs near field communication with another terminal for data transmission/reception or the electronic payment.

BACKGROUND

Along with the technology development, portable terminals, such as a cell phone, a PDA, a PMP, a navigator, and a laptop, additionally provide the functions, such as a DMB, a wireless internet, near field communication between the devices, in addition to fundamental functions, such as call, video/music playbacks, and navigation.

Therefore, various types of near field communication antennas, such as a Near Field Communication (NFC) antenna and a Magnetic Secure Transmission (MST) antenna are mounted in the portable terminal.

The NFC antenna is a contactless near field communication module using the frequency band of about 13.56 MHz, and transmits data between the terminals at a close distance of about 10 cm or less. The NFC antenna, other than payment, is widely used for transmission of product information at a supermarket or a store and travel information for a visitor, transportation, a lock device for access control and the like.

The MST antenna is an antenna for transmitting/receiving data for the electronic payment using the portable terminal, such as Samsung Pay.

In general, a conventional antenna for near field communication is formed of a planar winding structure having a radiation pattern formed on one surface of a substrate in order to obtain communication performance. At this time, since the conventional antenna for near field communication is formed of a planar winding structure, it is formed to have a large area for obtaining communication performance.

However, as the portable terminal such as a smart watch, which has recently become popular, is miniaturized, securing an antenna mounting space is becoming a big issue of manufacturers. That is, in order to miniaturize the portable terminal, the mounted parts should be miniaturized to minimize the mounting space, and there is a problem in that when miniaturizing the antenna for near field communication, it is difficult to secure communication performance.

In addition, there is a problem in that the case of the portable terminal is recently made of a metal material, thereby reducing the communication performance of the conventional antenna module for near field communication. That is, the conventional antenna module for near field communication is formed of a planar winding, the radiation field is shield by the case of the metal material, thereby reducing the communication performance thereof.

Therefore, it is required to develop an antenna module for near field communication capable of securing communication performance even in the portable terminal to which the case of the metal material is applied while minimizing the mounting space.

SUMMARY OF THE INVENTION

The present disclosure is intended to solve the above problems, and an object of the present disclosure is to provide an antenna module for near field communication, which stacks the laminates on which a vertical winding radiation pattern and a horizontal winding radiation pattern are formed, respectively, thereby improving the communication performance at the side surface and one side surface of the portable terminal while minimizing the mounting space.

For achieving the object, an antenna module for near field communication according to an embodiment of the present disclosure includes a first magnetic member, a vertical winding radiation pattern winding the outer circumference of the first magnetic member; a second magnetic member stacked on the lower surface of the first magnetic member, a horizontal winding radiation pattern formed on one surface of the second magnetic member, a dielectric stacked on the lower surface of the second magnetic member; and a terminal portion formed on the dielectric to be connected to at least one of the vertical winding radiation pattern and the horizontal winding radiation pattern.

For achieving the object, an antenna module for near field communication according to another embodiment of the present disclosure includes a first magnetic member, a vertical winding radiation pattern winding the outer circumference of the first magnetic member; a second magnetic member stacked on the lower surface of the first magnetic member, a side winding radiation pattern winding the side surfaces of the second magnetic member, and having one end connected to one end of the vertical winding radiation pattern; a dielectric stacked on the lower surface of the second magnetic member; and a terminal portion formed on the dielectric to be connected to at least one of the vertical winding radiation pattern and the side winding radiation pattern.

According to the present disclosure, it is possible for the antenna module for near field communication to implement the vertical winding radiation pattern and the horizontal winding radiation pattern by stacking the thin film sheets on which the radiation lines are formed, thereby improving the communication performance for near field communication while minimizing the mounting space when being mounted on a small portable terminal such as a smart watch by minimizing the size thereof.

In addition, it is possible for the antenna module for near field communication to form the radiation field at the front surface, the side surface, and the rear surface of the portable terminal by the vertical winding radiation pattern and the horizontal winding radiation pattern, thereby improving the communication characteristics while implementing near field communication in all directions (i.e., the side surface, the front surface, and the rear surface) of the portable terminal.

In addition, it is possible for the antenna module for near field communication to dispose the closed loop radiation pattern on the upper portion of the vertical winding radiation pattern to reinforce the radiation field in the vertical direction thereof, thereby improving the communication performance on the rear surface or the side surface of the portable terminal.

In addition, it is possible for the antenna module for near field communication to connect a capacitor between a pair of external terminals, which are connected to the horizontal winding radiation pattern disposed on the upper portion of the vertical winding radiation pattern, or to short them, thereby adjusting the resonance frequency according to its purpose by constituting the matching circuit.

In addition, it is possible for the antenna module for near field communication to form the auxiliary radiation pattern in at least one direction of the upper portion and lower portion directions of the vertical winding radiation pattern, thereby improving the near field communication performance at the front and rear surfaces of the portable terminal by increasing the area (or length) of the vertical winding radiation pattern to reinforce the radiation field formed on the front and rear surfaces of the portable terminal.

BRIEF DESCRIPTION OF DRAWINGS

FIGS. 1 to 3 are diagrams for explaining an antenna module for near field communication according to a first embodiment of the present disclosure.

FIG. 4 is a diagram for explaining a modified example of the antenna module for near field communication according to the first embodiment of the present disclosure.

FIGS. 5 to 7 are diagrams for explaining another modified example of the antenna module for near field communication according to the first embodiment of the present disclosure.

FIGS. 8 to 10 are diagrams for explaining an antenna module for near field communication according to a second embodiment of the present disclosure.

FIG. 11 is a diagram for explaining a modified example of the antenna module for near field communication according to the second embodiment of the present disclosure.

FIGS. 12 and 13 are diagrams for explaining an antenna module for near field communication according to a third embodiment of the present disclosure.

FIG. 14 is a diagram for explaining a modified example of the antenna module for near field communication according to the third embodiment of the present disclosure.

FIGS. 15 to 17 are diagrams for explaining an antenna module for near field communication according to a fourth embodiment of the present disclosure.

FIG. 18 is a diagram for explaining a modified example of the antenna module for near field communication according to the fourth embodiment of the present disclosure.

FIGS. 19 to 21 are diagrams for explaining another modified example of the antenna module for near field communication according to the fourth embodiment of the present disclosure.

FIGS. 22 and 23 are diagrams for explaining an antenna module for near field communication according to a fifth embodiment of the present disclosure.

FIG. 24 is a diagram for explaining a modified example of the antenna module for near field communication according to the fifth embodiment of the present disclosure.

DETAILED DESCRIPTION

Hereinafter, for detailed explanation to the extent that a person skilled in the art to which the present disclosure pertains may easily embody the technical spirit of the present disclosure, the most preferred embodiments of the present disclosure will be described in detail with reference to the accompanying drawings. First, it should be noted that in denoting reference numerals to the elements in each drawing, the same elements have the same reference numerals if possible even though illustrated in different drawings. In addition, in explaining the present disclosure, detailed description of related known configurations or functions will be omitted if it obscures the subject matter of the present disclosure.

An antenna module for near field communication according to an embodiment of the present disclosure is an antenna module for near field communication such as Near Field Communication (NFC) and Magnetic Secure Transmission (MST).

The antenna module for near field communication is formed in the form of a chip antenna, which minimizes the size in order to be mounted in a small portable terminal, and has a plurality of sheets, on which a radiation pattern is formed, stacked thereon in order to secure communication performance even in the portable terminal to which a case of a metal material is applied.

Referring to FIG. 1, the antenna module for near field communication according to a first embodiment of the present disclosure is configured to include a first laminate 100 and a second laminate 200 stacked on the lower surface of the first laminate 100. Herein, the first laminate 100 includes a first magnetic member and a vertical winding radiation pattern recited in the claim, and the second laminate 200 includes a second magnetic member, a horizontal winding radiation pattern, a dielectric, and a terminal part recited in the claim.

The first laminate 100 is configured to include a plurality of magnetic sheets. That is, the first laminate 100 is a magnetic laminate on which the plurality of magnetic sheets having radiation lines of a predetermined shape formed thereon are stacked. At this time, the radiation lines formed on the magnetic sheets forms a vertical winding radiation pattern 110 winding the magnetic laminate (i.e., the first laminate 100) in the vertical direction thereof by alternately winding the upper and lower surfaces of the magnetic laminate.

For example, referring to FIG. 2, the first laminate 100 may be configured to include a first magnetic sheet 120 having a plurality of first radiation lines 122 formed on the upper surface or the lower surface thereof to be spaced apart from each other, one or more second magnetic sheet 130 having a plurality of second radiation lines 132 formed on the side portion facing each other, and a third magnetic sheet 140 having a plurality of third radiation lines 142 formed on the upper surface or the lower surface thereof to be spaced apart from each other. At this time, the first laminate 100 is formed by stacking one or more second magnetic sheets 130 on the lower surface of the first magnetic sheet 120, and stacking the third magnetic sheet 140 on the lower surface of the second magnetic sheet 130 stacked on the lowermost end thereof.

The second radiation lines 132 electrically connect the first radiation lines 122 and the third radiation lines 142. That is, the second radiation line 132 has one end connected to one of the first radiation lines 122, and has the other end connected to one of the third radiation lines 142 to electrically connect the first radiation lines 122 and the third radiation lines 142.

At this time, the second radiation lines 132 are formed to be exposed to the outside from the side surface of the first laminate 100. That is, a plurality of via holes are formed in the first laminate 100 to connect the first radiation lines 122 and the second radiation lines 132, and then, a part of both sides of the first laminate 100 on which the via hole is formed is cut so that the via holes are exposed to the outside from the side surface of the first laminate 100. At this time, the via holes exposed to the outside form the second radiation lines 132.

As described above, the first laminate 100 has the plurality of second radiation lines 132, which are formed by exposing the part of the via holes formed on both sides thereof to the side surface thereof, connecting the first radiation lines 122 and the third radiation lines 142 to form the vertical winding radiation pattern 110 winding in the vertical direction thereof.

For another example, by firing the magnetic material to form a magnetic sintered body, and then printing or plating a conductive material on the magnetic sintered body, the vertical winding radiation pattern 110 winding the first laminate 100 in the vertical direction thereof may also be formed thereon.

The vertical winding radiation pattern 110 formed on the first laminate 100 has one end connected to one end of the horizontal winding radiation pattern 210 formed on the second laminate 200, and has the other end connected to one end of a first connection pattern 224 formed on the second laminate 200.

The second laminate 200 has the horizontal winding radiation pattern 210 winding in the planar direction formed on one surface thereof. That is, the second laminate 200 has the horizontal winding radiation pattern 210 formed in a loop shape formed on any one plane of the upper and lower surfaces. At this time, the horizontal winding radiation pattern 210 has one end connected to a terminal portion for connecting to a signal processing unit (not illustrated) of the portable terminal, and has the other end connected to one end of the vertical winding radiation pattern 110 formed on the first laminate 100.

For this purpose, the second laminate 200 is configured by stacking one or more magnetic sheets. At this time, the second laminate 200 includes a magnetic sheet having the horizontal winding radiation pattern 210 winding in the planar direction formed on one surface thereof.

For example, referring to FIG. 2, the second laminate 200 may be configured to include a fourth magnetic sheet 220 and a terminal sheet 230 stacked on the lower surface of the fourth magnetic sheet 220. Herein, the terminal sheet 230 includes the dielectric, the first terminal portion, and the second terminal portion as recited in the claims.

The fourth magnetic sheet 220 has the fourth radiation line 222 in a loop shape forming the horizontal winding radiation pattern 210 formed on one surface thereof. At this time, one end of the fourth radiation line 222 is connected to the internal terminal of the terminal sheet 230 through a via hole, and the other end thereof is connected to one end of the vertical winding radiation pattern 110 formed on the first laminate 100.

Meanwhile, the fourth magnetic sheet 220 may also have the first connection pattern 224 for connecting the other end of the vertical winding radiation pattern 110 to the internal terminal formed on the terminal sheet 230 formed thereon. At this time, one end of the first connection pattern 224 is connected to the other end of the vertical winding radiation pattern 110 of the first laminate 100, and the other end thereof is connected to the internal terminal of the terminal sheet 230 through a via hole. Herein, the first connection pattern 224 is connected to the internal terminal connected to one end of the horizontal winding radiation pattern 210 and another internal terminal.

One surface of the terminal sheet 230 has a pair of internal terminals disposed to be spaced apart from each other. That is, one surface of the terminal sheet 230 has a first internal terminal 231 connected to the other end of the horizontal winding radiation pattern 210 and a second internal terminal 232 connected to the other end of the vertical winding radiation pattern 110 disposed to be spaced apart from each other.

The other surface of the terminal sheet 230 has a pair of external terminals connected to the pair of internal terminals, respectively disposed to be spaced apart from each other. That is, the other surface of the terminal sheet 230 has a first external terminal 233 connected to the first internal terminal 231 through a via hole and a second external terminal 234 connected to the second internal terminal 232 through another via hole disposed to be spaced apart from each other.

As illustrated in FIG. 3, the antenna module for near field communication is composed of a stacked-type antenna including the vertical winding radiation pattern 110 and the horizontal winding radiation pattern 210 as the first laminate 100 and the second laminate 200 are stacked.

Therefore, the antenna module for near field communication may implement the vertical winding radiation pattern and the horizontal winding radiation pattern by stacking the thin film sheets on which the radiation lines are formed, thereby improving the communication performance while minimizing the mounting space when being mounted on a small portable terminal such as a smart watch by minimizing the size thereof.

In addition, the antenna module for near field communication may form the radiation field on the front surface, the side surface and the rear surface of the portable terminal by the vertical winding radiation pattern 110 and the horizontal winding radiation pattern 210, thereby improving the communication characteristics while performing near field communication.

Meanwhile, referring to FIG. 4, the antenna module for near field communication according to the first embodiment of the present disclosure has auxiliary radiation patterns for reinforcing the radiation field formed on the front surface or rear surface direction of the portable terminal formed thereon.

That is, the first laminate 100 may further include at least one of a first dielectric sheet 150 stacked on the upper surface of the first magnetic sheet 120, and a second dielectric sheet 160 stacked on the lower surface of the third magnetic sheet 140. Herein, the first dielectric sheet 150 and the second dielectric sheet 160 refer to different dielectrics as recited in the claims.

The first dielectric sheet 150 has a plurality of first auxiliary radiation lines 152 corresponding to the first radiation lines 122 formed in the first magnetic sheet 120, respectively formed to be spaced apart from each other thereon. At this time, both ends of the first auxiliary radiation line 152 are connected to one of the first radiation lines 122 through a via hole to form the auxiliary radiation pattern in the upper direction of the vertical winding radiation pattern 110.

The second dielectric sheet 160 has a plurality of second auxiliary radiation lines 162 corresponding to the third radiation lines 142 formed on the third magnetic sheet 140, respectively formed to be spaced apart from each other thereon. At this time, both ends of the second auxiliary radiation line 162 are connected to one of the third radiation lines 142 through a via hole to form the auxiliary radiation pattern in the lower direction of the vertical winding radiation pattern 110.

Therefore, the antenna module for near field communication may form the auxiliary radiation pattern in at least one direction of the upper and lower directions of the vertical winding radiation pattern 110, thereby improving the near field communication performance on the front and rear surfaces of the portable terminal by increasing the area (or length) of the vertical winding radiation pattern to reinforce the radiation field formed on the front and rear surfaces of the portable terminal.

Referring to FIG. 5, the antenna module for near field communication according to the first embodiment of the present disclosure may further include a third laminate 300 stacked on the upper surface of the first laminate 100. Herein, the third laminate 300 includes the third magnetic member and the closed loop radiation pattern as recited in the claims.

The third laminate 300 has a closed loop radiation pattern 310 winding in the planar direction formed on one surface thereof. That is, the third laminate 300 has the closed loop radiation pattern 310 formed in a loop shape formed on any one plane of the upper surface and the lower surface thereof. At this time, the closed loop radiation pattern 310 is formed in a loop shape, and both ends thereof are connected to each other to form a closed loop.

For this purpose, the third laminate 300 may be configured by stacking one or more magnetic sheets on which the radiation lines are formed.

For example, referring to FIG. 6, the third stack 300 may be formed by stacking a fifth magnetic sheet 320 and a sixth magnetic sheet 330.

The fifth magnetic sheet 320 has a fifth radiation line 322 in a loop shape formed on any one surface of the upper surface and the lower surface thereof. At this time, the fifth radiation line 322 is formed in an open loop shape in which both ends thereof are not connected.

The sixth magnetic sheet 330 is stacked on the upper surface of the fifth magnetic sheet 320. The sixth magnetic sheet 330 has a sixth radiation line 332 connected to both ends of the fifth radiation line 322 to constitute the closed loop radiation pattern 310 formed on any one surface of the upper surface and the lower surface thereof. At this time, both ends of the sixth radiation line 332 are connected to both ends of the fifth radiation line 322, respectively, through a via hole to form the closed loop radiation pattern 310.

As illustrated in FIG. 7, the antenna module for near field communication is composed of the stacked antenna including the vertical winding radiation pattern 110, the horizontal winding radiation pattern 210 disposed on the lower surface of the vertical winding radiation pattern 110, and the closed loop radiation pattern 310 disposed on the upper surface of the vertical winding radiation pattern 110, as the first laminate 100 to the third laminate 300 are stacked thereon. At this time, the closed loop radiation pattern 310 is connected to the vertical winding radiation pattern 110 through a coupling to reinforce the radiation field formed in the front surface or rear surface direction of the portable terminal.

As described above, the antenna module for near field communication may dispose the closed loop radiation pattern 310 on the upper portion of the vertical winding radiation pattern 110 to reinforce the radiation field, thereby improving the communication performance on the rear surface or the front surface of the portable terminal.

Referring to FIG. 8, the antenna module for near field communication according to a second embodiment of the present disclosure is configured to include a first laminate 400, a second laminate 500 stacked on the lower surface of the first laminate 400, and a third laminate 600 stacked on the upper surface of the first laminate 400. Herein, the first laminate 400 includes the first magnetic member and the vertical winding radiation pattern as recited in the claims, the second laminate 500 includes the second magnetic member, the horizontal winding radiation pattern, the dielectric, and the terminal portion as recited in the claims, and the third laminate 600 includes the third magnetic member and another horizontal winding radiation pattern as recited in the claims.

The first laminate 400 is configured to include a plurality of magnetic sheets. That is, the first laminated 400 is a magnetic laminate on which a plurality of magnetic sheets having radiation lines of a predetermined shape formed thereon are stacked. At this time, the radiation lines formed on the magnetic sheets form a vertical winding radiation pattern 410 winding the magnetic laminate (i.e., the first laminate 400) in the vertical direction thereof by alternately winding the upper surface and the lower surface of the magnetic laminate.

For example, the first laminate 400 is formed by stacking one or more second magnetic sheets 430 on the lower surface of the first magnetic sheet 420, and stacking a third magnetic sheet 430 on the lower surface of the second magnetic sheet 430 stacked on the lowermost end thereof.

The first magnetic sheet 420 has a plurality of first radiation lines 422 formed to be spaced apart from each other on the upper surface or the lower surface thereof. At this time, the first magnetic sheet 420 has a first connection pattern 424 and a second connection pattern 426 connected to both ends of a second horizontal winding radiation pattern 610, respectively, formed on a third laminate 600, which will be described later, formed thereon.

The second magnetic sheet 430 has a plurality of second radiation lines 432 formed on the side portions facing each other. At this time, the second magnetic sheet 430 has a third connection pattern 434 and a fourth connection pattern 436 connected to both ends of the second horizontal winding radiation pattern 610, respectively, formed on the third laminate 600, which will be described later, formed thereon.

The third magnetic sheet 440 has a plurality of third radiation lines 442 formed to be spaced apart from each other on the upper surface or the lower surface thereof. At this time, the third magnetic sheet 440 has a fifth connection pattern 444 and a sixth connection pattern 446 connected to both ends of the second horizontal winding radiation pattern 610, respectively, formed on the third laminate 600, which will be described later, formed thereon.

Herein, the first connection pattern 424, the third connection pattern 434, and the fifth connection pattern 444 are connected to each other through the via holes after the first magnetic sheet 420 to the third magnetic sheet 440 are stacked thereon. The second connection pattern 426, the fourth connection pattern 436, and the sixth connection pattern 446 may be connected through a via hole after the first magnetic sheet 420 to the third magnetic sheet 440 are stacked thereon.

Meanwhile, the second radiation lines 432 electrically connect the first radiation lines 422 and the third radiation lines 442. That is, the second radiation line 432 has one end connected to one of the first radiation lines 422, and has the other end connected to one of the third radiation lines 442 to electrically connect the first radiation lines 422 and the third radiation lines 442.

At this time, the second radiation lines 432 are formed to be exposed to the outside from the side surface of the first laminate 400. That is, a plurality of via holes are formed in the first laminate 400 to connect the first radiation lines 422 and the second radiation lines 432, and then, a part of both side surfaces of the first laminate 400 in which the via hole is cut so that the via holes are exposed to the outside from the side surface of the first laminate 400. At this time, the via holes exposed to the outside form the second radiation lines 432.

As described above, the first laminate 400 has the plurality of second radiation lines 432, which are formed by exposing the part of the via holes formed on both sides thereof to the side surface thereof, connecting the first radiation lines 422 and the third radiation lines 442 to form the vertical winding radiation pattern 410 winding in the vertical direction thereof.

For another example, by firing a magnetic material to form a magnetic sintered body, and then printing or plating a conductive material on the magnetic sintered body, the vertical winding radiation pattern 410 winding the first laminate 400 in the vertical direction thereof may also be formed thereon.

The vertical winding radiation pattern 410 formed on the first laminate 400 has one end connected to one end of the horizontal winding radiation pattern formed on the second laminate 500, and has the other end connected to one end of the first connection pattern 424 formed on the second laminate 500.

The second laminate 500 has a first horizontal winding radiation pattern 510 winding in the planar direction formed on one surface thereof. That is, the second laminate 500 has the first horizontal winding radiation pattern 510 formed in a loop shape formed on any one plane of the upper and lower surfaces. At this time, the first horizontal winding radiation pattern 510 has one end connected to a terminal portion for connecting to a signal processing unit (not illustrated) of the portable terminal, and has the other end connected to one end of the vertical winding radiation pattern 410 formed on the first laminate 400.

For this purpose, the second laminate 500 is configured by stacking one or more magnetic sheets. At this time, the second stack 500 includes a magnetic sheet having the first horizontal winding radiation pattern 510 winding in the planar direction formed on one surface thereof.

For example, the second laminate 500 may be configured to include a fourth magnetic sheet 520 and a terminal sheet 530 stacked on the lower surface of the fourth magnetic sheet 520. Herein, the terminal sheet 230 refers to the dielectric and the first to fourth terminal portions as recited in the claims.

One surface of the fourth magnetic sheet 520 has a fourth radiation line 522 in a loop shape forming the first horizontal winding radiation pattern 510 formed. At this time, one end of the fourth radiation line 522 is connected to the internal terminal of the terminal sheet 530 through a via hole, and the other end thereof is connected to one end of the vertical winding radiation pattern 410 formed on the first laminate 400.

Meanwhile, the fourth magnetic sheet 520 may has a seventh connection pattern 524 for connecting the vertical winding radiation pattern 410 to the internal terminal formed on the terminal sheet 530 formed thereon. At this time, one end of the seventh connection pattern 524 is connected to the other end of the vertical winding radiation pattern 410 of the first laminate 400. The other end of the seventh connection pattern 524 is connected to the internal terminal of the terminal sheet 530 through a via hole. Herein, the seventh connection pattern 524 is connected to the internal terminal connected to one end of the horizontal winding radiation pattern and another internal terminal.

The fourth magnetic sheet 520 has an eighth connection pattern 526 connected to the first connection pattern 424, the third connection pattern 434, and the fifth connection pattern 444 of the first laminate 400, and a ninth connection pattern 528 connected to the second connection pattern 426, the fourth connection pattern 436, and the sixth connection pattern 446 formed thereon.

The terminal sheet 530 has two pairs of internal terminals disposed to be spaced apart from each other on one surface thereof. That is, one surface of the terminal sheet 530 has a first internal terminal 531 connected to the other end of the vertical winding radiation pattern 410, a second internal terminal 532 connected to one end of the second horizontal winding radiation pattern 610, a third internal terminal 533 connected to one end of the first horizontal winding radiation pattern 510, and a fourth internal terminal 534 connected to the other end of the second horizontal winding radiation pattern 610 formed to be spaced apart from each other.

The terminal sheet 530 has two pairs of external terminals, which are connected to the internal terminals, respectively, through a via hole, disposed to be spaced apart from each other on the other surface thereof. That is, the other surface of the terminal sheet 530 has a first external terminal 535 connected to the first internal terminal 531 through a via hole, a second external terminal 535 connected to the second internal terminal 532 through another via hole, a third external terminal 537 connected to the third internal terminal 533 via still another via hole, and a fourth external terminal 538 connected to the fourth internal terminal 534 through yet another via hole disposed to be spaced apart from each other.

The third laminate 600 has the second horizontal winding radiation pattern 610 winding in the planar direction formed thereon. That is, the third laminate 600 has the second horizontal winding radiation pattern 610 formed in a loop shape formed on any one plane of the upper surface and the lower surface thereof.

For this purpose, the third laminate 600 may be configured by stacking one or more magnetic sheets on which radiation lines are formed.

For example, the third stack 600 may be formed by stacking a fifth magnetic sheet 620 and a sixth magnetic sheet 630.

The fifth magnetic sheet 620 has a fifth radiation line 622 in a loop shape formed on any one surface of the upper surface and the lower surface thereof. At this time, the fifth radiation line 622 is formed in an open loop shape in which both ends thereof are not connected.

The sixth magnetic sheet 630 is stacked on the lower surface of the fifth magnetic sheet 620. The sixth magnetic sheet 630 has a sixth radiation line 632 and a seventh radiation line 634 connected to both ends of the fifth radiation line 622, respectively, formed on any one surface of the upper surface and the lower surface thereof.

At this time, the sixth radiation line 632 has one end connected to one end of the fifth radiation line 622 through a via hole, and has the other end connected to the first connection pattern 424 of the first laminate 400 through another via hole. The seventh radiation line 634 is connected to the other end of the fifth radiation line 622 and the second connection pattern 426 of the first laminate 400 through another via hole.

As illustrated in FIG. 9, the antenna module for near field communication is composed of the stacked-type antenna including the vertical winding radiation pattern 410, the first horizontal winding radiation pattern 510 disposed on the lower portion of the vertical winding radiation pattern 410, and the second horizontal winding radiation pattern 610 disposed on the upper portion of the vertical winding radiation pattern 410, as the first laminate 400 to the third laminate 600 are stacked thereon.

Therefore, the antenna module for near field communication may implement the vertical winding radiation patterns 410 and the horizontal winding radiation patterns 510, 610 by stacking the thin film sheets on which radiation lines are formed, thereby improving the communication performance for near field communication while minimizing the mounting space when being mounted in a small portable terminal such as a smart watch by minimizing the size thereof.

In addition, the antenna module for near field communication may form the radiation field on the front surface, the side surface, and the rear surface of the portable terminal by the vertical winding radiation patterns 410 and the horizontal winding radiation patterns 510, 610, thereby improving the communication characteristics while performing near field communication in all directions (i.e., the side surface, the front surface, and the rear surface) of the portable terminal.

As illustrated in FIG. 10, the antenna module for near field communication may also constitute a matching circuit by connecting a capacitor between a pair of external terminals connected to a pair of internal terminals connected to the horizontal winding radiation pattern of the third laminate 600, or shoring them. In this case, it is possible to adjust the resonance frequency of the antenna module for near field communication according to the purpose.

Meanwhile, referring to FIG. 11, the antenna module for near field communication according to the second embodiment of the present disclosure may also have an auxiliary radiation pattern for reinforcing the radiation field in the vertical direction (i.e., the front surface or rear surface direction of the portable terminal) formed therein.

That is, the first laminate 400 may further include at least one of a first dielectric sheet 450 stacked on the upper surface of the first magnetic sheet 420 and a second dielectric sheet 460 stacked on the lower surface of the third magnetic sheet 440. Herein, the first dielectric sheet 450 and the second dielectric sheet 460 refer to different dielectrics as recited in the claims.

The first dielectric sheet 450 has a plurality of first auxiliary radiation lines 452 corresponding to the first radiation lines 422, respectively, formed on the first magnetic sheet 420 formed to be spaced apart from each other thereon. At this time, both ends of the first auxiliary radiation line 452 are connected to one of the first radiation lines 422 through a via hole to form an auxiliary radiation pattern in the upper direction of the vertical winding radiation pattern 410.

The first dielectric sheet 450 may further have a tenth connection pattern 454 and an eleventh connection pattern 456 connected to both ends of the second horizontal winding radiation pattern 610, respectively, formed thereon.

The second dielectric sheet 460 has a plurality of second auxiliary radiation lines 462 corresponding to the third radiation lines 442, respectively, formed on the third magnetic sheet 440 formed to be spaced apart from each other thereon. At this time, both ends of the second auxiliary radiation line 462 are connected to one of the third radiation lines 442 through a via hole to form an auxiliary radiation pattern in the lower direction of the vertical winding radiation pattern 410.

The second dielectric sheet 460 may have a twelfth connection pattern 464 connected to the first connection pattern 424, the third connection pattern 434, and the fifth connection pattern 444, and a thirteenth connection pattern 466 connected to the second connection pattern 426, the fourth connection pattern 436, and the sixth connection pattern 446 formed thereon.

Therefore, the antenna module for near field communication may form the auxiliary radiation pattern in at least one direction of the upper and lower directions of the vertical winding radiation pattern 410, thereby improving the near field communication performance on the front and rear surfaces of the portable terminal by increasing the area (or length) of the vertical winding radiation pattern 410 to reinforce the radiation field formed on the front and rear surfaces of the portable terminal.

Referring to FIG. 12, the antenna module for near field communication according to a third embodiment of the present disclosure is configured to include a first laminate 700 and a second laminate 800 stacked on the lower surface of the first laminate 700. Herein, the first laminate 700 includes the first magnetic member and the vertical winding radiation pattern as recited in the claims, and the second laminate 800 includes the second magnetic member, the side winding radiation pattern, the dielectric, and the terminal portion as recited in the claims.

The first laminate 700 is configured to include a plurality of magnetic sheets. That is, the first laminate 700 is a magnetic laminate on which a plurality of magnetic sheets having radiation lines of a predetermined shape formed thereon are stacked. At this time, the radiation lines formed on the magnetic sheets form a vertical winding radiation pattern 710 winding the first laminate 700 in the vertical direction thereof by alternately winding the upper surface and the lower surface of the magnetic laminate (i.e., the first laminate 700).

For example, referring to FIG. 13, the first laminate 700 may be configured to include a first magnetic sheet 720 having a plurality of first radiation lines 722 formed to be spaced apart from each other on the upper surface or the lower surface thereof one or more second magnetic sheets 730 having a plurality of second radiation lines 732 formed on the side surfaces facing each other, and a third magnetic sheet 740 having a plurality of third radiation lines 742 formed to be spaced apart from each other on the upper surface or the lower surface thereof.

At this time, the first laminate 700 is formed by stacking one or more second magnetic sheets 730 on the lower surface of the first magnetic sheet 720, and stacking the third magnetic sheet 730 on the lower surface of the second magnetic sheet 730 stacked on the lowermost end thereof.

The second radiation lines 732 electrically connect the first radiation lines 722 and the third radiation lines 742. That is, the second radiation line 732 has one end connected to one of the first radiation lines 722, and has the other end connected to one of the third radiation lines 742 to electrically connect the first radiation lines 722 and the third radiation lines 742.

At this time, the second radiation lines 732 are formed to be exposed to the outside from the side surface of the first laminate 700. That is, a plurality of via holes are formed in the first laminate 700 to connect the first radiation lines 722 and the second radiation lines 732, and then a part of both sides of the first laminate 700 on which via hole is formed is cut so that the via holes are exposed from the side surface of the first laminate 700 to the outside. At this time, the via holes exposed to the outside form the second radiation lines 732.

For another example, by firing a magnetic material to form a magnetic sintered body, and then printing or plating a conductive material on the magnetic sintered body, the vertical winding radiation pattern 710 winding the first laminate 700 in the vertical direction thereof may also be formed thereon.

As described above, the first laminate 700 has a plurality of second radiation lines 732, which are formed by exposing the part of the via holes formed on both sides thereof to the side surface thereof, connecting the first radiation lines 722 and the third radiation lines 742 to form the vertical winding radiation pattern 710 winding in the vertical direction thereof.

The vertical winding radiation pattern 710 formed on the first laminate 700 has one end connected to one end of a side winding radiation pattern 810 formed on the second laminate 800, and has the other end connected to one end of a first connection pattern 824 formed on the second laminate 800. Therefore, the vertical winding radiation pattern 710 is connected to the terminals disposed at the lowermost end of the antenna module for near field communication.

The second laminate 800 is configured by stacking a plurality of magnetic sheets. That is, the second laminate 800 is configured by stacking a plurality of fourth magnetic sheets 820 thereon, and stacking a terminal sheet 830 on the lower portion of the fourth magnetic sheet 820 stacked on the lowermost portion thereof. At this time, the second laminate 800 has the magnetic sheets, on which radiation lines are formed, stacked along the outer circumference of one surface thereof or the side surface thereof to form the side winding radiation pattern 810 winding the side surfaces of the second laminate 800. Herein, the terminal sheet 730 includes the dielectric, the first terminal portion, and the second terminal portion as recited in the claims.

The fourth magnetic sheet 820 has a fourth radiation line 822 formed on the outer circumference of one surface thereof or the side surfaces thereof. At this time, the fourth radiation lines 822 formed on the fourth magnetic sheets 820 are connected to each other through a via hole to form the side winding radiation pattern 810 winding the side surfaces of the second laminate 800.

The fourth magnetic sheet 820 has first connection patterns 824 for connecting one end of the vertical winding radiation pattern 710 formed in the first laminate 700 to a second internal terminal 832 of the terminal sheet 830 formed thereon. At this time, the first connection patterns 824 formed on the fourth magnetic sheets 820 are connected through a via hole to connect one end of the vertical winding radiation pattern 710 to the second internal terminal 832.

The side winding radiation pattern 810 has one end connected to the other end of the vertical winding radiation pattern 710 formed on the first laminate 700, and has the other end connected to the first internal terminal 831 formed on the terminal sheet 830.

The terminal sheet 830 has a pair of internal terminals disposed to be spaced apart from each other on one surface thereof. That is, one surface of the terminal sheet 830 has the first internal terminal 831 connected to the other end of the side winding radiation pattern 810 and the second internal terminal 832 connected to one end of the vertical winding radiation pattern 710 through the first connection pattern 824 disposed to be spaced apart from each other.

The terminal sheet 830 has a pair of external terminals connected to a pair of internal terminals, respectively, disposed to be spaced apart from each other on the other surface thereof. That is, the other surface of the terminal sheet 830 has a first external terminal 833 connected to the first internal terminal 831 through a via hole and a second external terminal 834 connected to the second internal terminal 832 through another via hole disposed to be spaced apart from each other.

As described above, the antenna module for near field communication is composed of the stacked-type antenna including the vertical winding radiation pattern 710 and the side winding radiation pattern 810, as the first laminate 700 and the second laminate 800 are stacked thereon.

Therefore, the antenna module for near field communication may implement the vertical winding radiation pattern 710 and the side winding radiation pattern 810 by stacking the thin film sheets on which radiation lines are formed, thereby improving the communication performance for near field communication while minimizing the mounting space when being mounted in a small portable terminal such as a smart watch by minimizing the size thereof.

In addition, the antenna module for near field communication may form the radiation field on the front surface, the side surface, and the rear surface of the portable terminal by the vertical winding radiation pattern 710 and the side winding radiation pattern 810, thereby improving the communication characteristics while performing near field communication in all directions (i.e., the side surface, the front surface, and the rear surface) of the portable terminal.

Meanwhile, referring to FIG. 14, the antenna module for near field communication according to the third embodiment of the present disclosure may have an auxiliary radiation pattern for reinforcing the radiation field in the front surface or rear surface direction of the portable terminal.

That is, the first laminate 700 may further include a first dielectric sheet 750 stacked on the upper surface of the first magnetic sheet 720, and a second dielectric sheet 760 stacked on the lower surface of the third magnetic sheet 740. Herein, the first dielectric sheet 750 and the second dielectric sheet 760 refer to different dielectrics as recited in the claims.

At this time, the first dielectric sheet 750 has a plurality of first auxiliary radiation lines 752 corresponding to the first radiation lines 722, respectively, formed on the first magnetic sheet 720 formed to be spaced apart from each other thereon. Both ends of the first auxiliary radiation line 752 formed on the first dielectric sheet 750 are connected to the first radiation line 722 through a via hole.

The second dielectric sheet 760 has a plurality of second auxiliary radiation lines 762 corresponding to the third radiation lines 742, respectively, formed on the third magnetic sheet 740 formed to be spaced apart from each other thereon. Both ends of the second auxiliary radiation line 762 formed on the second dielectric sheet 760 are connected to the third radiation line 742 through a via hole.

At this time, the second dielectric sheet 760 may have a second connection pattern 764 for connecting one end of the vertical winding radiation pattern 710 to the first connection pattern 824, and a third connection pattern 766 for connecting the other end of the vertical winding radiation pattern 710 to one end of the side winding radiation pattern 810 formed thereon.

Therefore, the antenna module for near field communication may form the auxiliary radiation pattern in at least one direction of the upper and lower directions of the vertical winding radiation pattern 710, thereby improving the near field communication performance on the front and rear surfaces of the portable terminal by increasing the area (or length) of the vertical winding radiation pattern 710 to reinforce the radiation field formed on the front and rear surfaces of the portable terminal.

Referring to FIG. 15, the antenna module for near field communication according to a fourth embodiment of the present disclosure is configured to include a first laminate 1100 and a second laminate 1200 stacked on the lower surface of the first laminate 1100. Herein, the first laminate 1100 includes the first magnetic member and the vertical winding radiation pattern as recited in the claims, and the second laminate 1200 includes the second magnetic member, the horizontal winding radiation pattern, the dielectric, and the terminal portion as recited in the claims.

The first laminate 1100 is configured to include a plurality of magnetic sheets. That is, the first laminate 1100 is a magnetic laminate on which a plurality of magnetic sheets having radiation lines of a predetermined shape formed thereon are stacked. At this time, the radiation lines formed on the magnetic sheets forms a vertical winding radiation pattern 1110 winding the first laminate 1100 in the vertical direction thereof, that is, by alternately winding the upper surface and the lower surface of the magnetic laminate.

For example, referring to FIG. 16, the first laminate 1100 may be configured to include a first magnetic sheet 1120 having a plurality of first radiation line 1122 formed to be spaced apart from each other on the upper surface or the lower surface thereof, one or more second magnetic sheet 1130 having a plurality of second radiation lines 1132 formed on the side surfaces facing each other, and a third magnetic sheet 1140 having a plurality of radiation lines 1142 formed to be spaced apart from each other on the upper surface or the lower surface thereof. At this time, the first laminate 1100 is formed by stacking one or more second magnetic sheets 1130 on the lower surface of the first magnetic sheet 1120, and stacking the third magnetic sheet 1140 on the lower surface of the second magnetic sheet 1130 stacked on the lowermost end thereof.

The second radiation lines 1132 electrically connect the first radiation lines 1122 and the third radiation lines 1142. That is, the second radiation line 1132 has one end connected to one of the first radiation lines 1122, and has the other end connected to one of the third radiation lines 1142 to electrically connect the first radiation lines 1122 and the third radiation lines 1142.

At this time, the second radiation lines 1132 are formed to be exposed to the outside from the side surface of the first laminate 1100. That is, a plurality of via holes are formed in the first laminate 1100 to connect the first radiation lines 1122 and the second radiation lines 1132, and then a part of both sides of the first laminate 1100 in which the via hole is formed is cut so that the via holes are exposed to the outside from the side surface of the first laminate 1100. At this time, the via holes exposed to the outside form the second radiation lines 1132.

As described above, the first laminate 100 has the plurality of second radiation lines 1132, which are formed by exposing a part of the via hole formed at both sides thereof to the side surface thereof, connecting the first radiation lines 1122 and the third radiation lines 1142 to form the vertical winding radiation pattern 1110 winding in the vertical direction thereof.

For another example, by firing a magnetic material to form a magnetic sintered body, and then printing or plating a conductive material on the magnetic sintered body, the vertical winding radiation pattern 1110 winding the first laminate 1100 in the vertical direction thereof may also be formed thereon.

The vertical winding radiation pattern 1110 formed on the first laminate 1100 has both ends connected to the connection patterns formed on the second laminate 1200, respectively. That is, one end of the vertical winding radiation pattern 1110 is connected to a first connection pattern 1224 formed on the second laminate 1200, and the other end thereof is connected to a second connection pattern 1226.

The second laminate 1200 has a horizontal winding radiation pattern 1210 winding in the planar direction thereof formed on one surface thereof. That is, the second laminate 1200 has the horizontal winding radiation pattern 1210 formed in a loop shape formed on any one plane of the upper and lower surfaces thereof. At this time, the horizontal winding radiation pattern 1210 has both ends connected to a terminal portion for connecting to a signal processing unit (not illustrated) of the portable terminal.

For this purpose, the second laminate 1200 is configured by stacking one or more magnetic sheets thereon. At this time, the second laminate 1200 includes a magnetic sheet having the horizontal winding radiation pattern 1210 winding in the planar direction thereof formed on one surface thereof.

For example, referring to FIG. 16, the second laminate 1200 may be configured to include a fourth magnetic sheet 1220 and a terminal sheet 1230 stacked on the lower surface of the fourth magnetic sheet 1220. Herein, the terminal sheet 1230 includes the dielectric body, the first terminal portion, and the second terminal portion as recited in the claims.

The fourth magnetic sheet 1220 has a fourth radiation line 1222 in a loop shape forming the horizontal winding radiation pattern 1210 formed on one surface thereof. Both ends of the fourth radiation line 1222 are connected to the internal terminal of the terminal sheet 1230 through a via hole. At this time, one end of the fourth radiation line 1222 is connected to a third internal terminal 1233 of the terminal sheet 1230 through a via hole, and the other end thereof is connected to a fourth internal terminal 1234 of the terminal sheet 1230 through another via hole.

Meanwhile, the fourth magnetic sheet 1220 may have the first connection pattern 1224 and the second connection pattern 1226 for connecting both ends of the vertical winding radiation pattern 1110 to the internal terminals formed on the terminal sheet 1230 formed thereon. At this time, one end of the first connection pattern 1224 is connected to one end of the vertical winding radiation pattern 1110 of the first laminate 1100, and the other end thereof is connected to the internal terminal (i.e., the first internal terminal 1231) of the terminal sheet 1230 through a via hole. Herein, one end of the second connection pattern 1226 is connected to the other end of the vertical winding radiation pattern 1110 of the first laminate 1100, and the other end thereof is connected to the internal terminal (i.e., the second internal terminal 1232) of the terminal sheet 1230 through a via hole.

The terminal sheet 1230 has two pairs of internal terminals formed to be spaced apart from each other on one surface thereof. That is, one surface of the terminal sheet 1230 has the first internal terminal 1231 connected to one end of the vertical winding radiation pattern 1110, the second internal terminal 1232 connected to the other end of the vertical winding radiation pattern 1110, the third internal terminal 1233 connected to one end of the horizontal winding radiation pattern 1210, and the fourth internal terminal 1234 connected to the other end of the horizontal winding radiation pattern 1210 disposed to be spaced apart from each other.

The terminal sheet 1230 has two pairs of external terminals connected to the internal terminals, respectively, disposed to be spaced apart from each other on the other surface thereof. That is, the other surface of the terminal sheet 1230 has a first external terminal 1235 connected to the first internal terminal 1231 through a via hole, a second external terminal 1236 connected to the second internal terminal 1232 through another via hole, a third external terminal 1237 connected to the third internal terminal 1233 via still another via hole, and a fourth external terminal 1238 connected to the fourth internal terminal 1234 via yet another via hole disposed to be spaced apart from each other.

As illustrated in FIG. 17, the antenna module for near field communication is composed of the stacked-type antenna including the vertical winding radiation pattern 1110 and the horizontal winding radiation pattern 1210, as the first laminate 1100 and the second laminate 1200 are stacked thereon.

Therefore, the antenna module for near field communication may implement the vertical winding radiation pattern and the horizontal winding radiation pattern by stacking the thin film sheets on which radiation lines are formed, thereby improving the communication performance for near field communication while minimizing the mounting space when being mounted on a small portable terminal such as a smart watch by minimizing the size thereof.

In addition, the antenna module for near field communication may form the radiation field on the front surface, the side surface, and the rear surface of the portable terminal by the vertical winding radiation pattern 1110 and the horizontal winding radiation pattern 1210, thereby improving the communication characteristics while performing the near field communication in all directions (i.e., the side surface, the front surface, and the rear surface) of the portable terminal.

Meanwhile, referring to FIG. 18, the antenna module for near field communication according to the fourth embodiment of the present disclosure may also have auxiliary radiation patterns for reinforcing the radiation field in the front surface or rear surface direction of the portable terminal formed thereon.

That is, the first laminate 1100 may further include at least one of the first dielectric sheet 1150 stacked on the upper surface of the first magnetic sheet 1120 and the second dielectric sheet 1160 stacked on the lower surface of the third magnetic sheet 1140. Herein, the first dielectric sheet 1150 and the second dielectric sheet 1160 refer to different dielectrics as recited in the claims.

The first dielectric sheet 1150 has a plurality of first auxiliary radiation lines 1152 corresponding to the first radiation lines 1122 formed on the first magnetic sheet 1120, respectively, formed to be spaced apart from each other thereon. At this time, both ends of the first auxiliary radiation line 1152 are connected to one of the first radiation lines 1122 through a via hole to form an auxiliary radiation pattern in the upper direction of the vertical winding radiation pattern 1110.

The second dielectric sheet 1160 has a plurality of second auxiliary radiation lines 1162 corresponding to the third radiation lines 1142 formed on the third magnetic sheet 1140, respectively, formed to be spaced apart from each other thereon. At this time, both ends of the second auxiliary radiation line 1162 are connected to one of the third radiation lines 1142 through a via hole to form an auxiliary radiation pattern in the lower direction of the vertical winding radiation pattern 1110.

Therefore, the antenna module for near field communication may form the auxiliary radiation pattern in at least one direction of the upper and lower directions of the vertical winding radiation pattern 1110, thereby improving the near field communication performance on the front and rear surfaces of the portable terminal by increasing the area (or length) of the vertical winding radiation pattern to reinforce the radiation field formed on the front and rear surfaces of the portable terminal.

Referring to FIG. 19, the antenna module for near field communication according to the fourth embodiment of the present disclosure may further include a third laminate 1300 stacked on the upper surface of the first laminate 1100. Herein, the third laminate 1300 includes the third magnetic member and the closed loop radiation pattern as recited in the claims.

The third laminate 1300 has a closed loop radiation pattern 1310 winding in the planar direction formed on one surface thereof. That is, the third laminate 1300 has the closed loop radiation pattern 1310 formed in a loop shape formed on any one plane of the upper surface and the lower surface thereof. At this time, the closed loop radiation pattern 1310 is formed in a loop shape, and both ends thereof are connected to each other to form a closed loop.

For this purpose, the third laminate 1300 may be configured by stacking one or more magnetic sheets on which radiation lines are formed.

For example, referring to FIG. 20, the third laminate 1300 may be formed by stacking a fifth magnetic sheet 1320 and a sixth magnetic sheet 1330 thereon.

The fifth magnetic sheet 1320 has a fifth radiation line 1322 in a loop shape formed on any one surface of the upper surface and the lower surface thereof. At this time, the fifth radiation line 1322 is formed in an open loop shape in which both ends thereof are not connected.

The sixth magnetic sheet 1330 is stacked on the upper surface of the fifth magnetic sheet 1320. The sixth magnetic sheet 1330 has a sixth radiation line 1332 connected to both ends of the fifth radiation line 1322 to constitute the closed loop radiation pattern 1310 formed on any one surface of the upper surface and the lower surface thereof. At this time, both ends of the sixth radiation line 1332 are connected to both ends of the fifth radiation line 1322 through a via hole, respectively, to form the closed loop radiation pattern 1310.

As illustrated in FIG. 21, the antenna module for near field communication is composed of the stacked-type antenna including the vertical winding pattern 1110, the horizontal winding radiation pattern 1210 disposed on the lower surface of the vertical winding radiation pattern 1110, and the closed loop radiation pattern 1310 disposed on the upper surface of the vertical winding radiation pattern 1110, as the first to third laminates 1100 to 1300 are stacked thereon. At this time, the closed loop radiation pattern 1310 is connected to the vertical winding radiation pattern 1110 through a coupling to reinforce the radiation field formed in the front surface or rear surface direction of the portable terminal.

Therefore, the antenna module for near field communication may dispose the closed loop radiation pattern 1310 on the upper portion of the vertical winding radiation pattern 1110 to reinforce the radiation field in the vertical direction thereof, thereby improving the communication performance on the rear surface or the front surface of the portable terminal.

Referring to FIG. 22, the antenna module for near field communication according to a fifth embodiment of the present disclosure is configured to include a first laminate 1400 and a second laminate 1500 stacked on the lower surface of the first laminate 1400. Herein, the first laminate 1400 includes the first magnetic member and the vertical winding radiation pattern as recited in the claims, and the second laminate 1500 includes the second magnetic member, the side winding radiation pattern, the dielectric, and the terminal portion as recited in the claims.

The first laminate 1400 is configured to include a plurality of magnetic sheets. That is, the first laminated 1400 is a magnetic laminate on which a plurality of magnetic sheets having radiation lines of a predetermined shape formed thereon are stacked. At this time, the radiation lines formed on the magnetic sheets forms a vertical winding radiation pattern 1410 winding the first laminate 1400 in the vertical direction thereof by alternately winding the upper surface and the lower surface of the magnetic laminate (i.e., the first laminate 1400).

For example, referring to FIG. 23, the first laminate 1400 may be configured to include a first magnetic sheet 1420 having a plurality of first radiation lines 1422 formed to be spaced apart from each other on the upper surface or the lower surface thereof, one or more second magnetic sheet 1430 having a plurality of second radiation lines 1432 formed on the side surfaces facing each other, and a third magnetic sheet 1440 having a plurality of third radiation lines 1442 formed to be spaced apart from each other on the upper surface or the lower surface thereof.

At this time, the first laminate 1400 is formed by stacking one or more second magnetic sheets 1430 on the lower surface of the first magnetic sheet 1420, and stacking the third magnetic sheet 1440 on the lower surface of the second magnetic sheet 1430 stacked on the lowermost end thereof.

The second radiation lines 1432 electrically connect the first radiation lines 1422 and the third radiation lines 1442. That is, the second radiation line 1432 has one end connected to one of the first radiation lines 1422, and has the other end connected to one of the third radiation lines 1442 to electrically connect the first radiation lines 1422 and the third radiation lines 1442.

At this time, the second radiation lines 1432 are formed to be exposed to the outside from the side surface of the first laminate 1400. That is, a plurality of via holes are formed in the first laminate 1400 to connect the first radiation lines 1422 and the second radiation lines 1432, and then a part of both sides of the first laminate 1400 in which via hole is formed is cut so that the via holes are exposed to the outside from the side surface of the first laminate 1400. At this time, the via holes exposed to the outside form the second radiation lines 1432.

For another example, by firing a magnetic material to form a magnetic sintered body, and then printing or plating a conductive material on the magnetic sintered body, a vertical winding radiation pattern 1410 winding the first laminate 1400 in the vertical direction thereof may also be formed thereon.

As described above, the first laminate 1400 has a plurality of second radiation lines 1432 formed by exposing a part of the via holes formed at both sides thereof to the side surface thereof connecting the first radiation lines 1422 and the third radiation lines 1442 to form the vertical winding radiation pattern 1410 winding in the vertical direction thereof.

The vertical winding radiation pattern 1410 formed on the first laminate 1400 has both ends connected to the connection patterns formed on the second laminate 1500, respectively. That is, one end of the vertical winding radiation pattern 1410 is connected to a first connection pattern 1524 through a via hole, and the other end thereof is connected to a second connection pattern 1526 through another via hole. Therefore, the vertical winding radiation pattern 1410 is connected to the terminals disposed at the lowermost end of the antenna module for near field communication.

The second laminate 1500 is configured by stacking a plurality of magnetic sheets. That is, the second laminate 1500 is configured by stacking a plurality of fourth magnetic sheets 1520, and stacking a terminal sheet 1530 on the lower portion of the fourth magnetic sheet 1520 stacked on the lowermost portion thereof.

At this time, the second laminate 1500 has the magnetic sheets, on which radiation lines are formed, stacked along the outer circumference of one surface thereof or the side surface thereof to form the side winding radiation pattern 1510 winding the side faces of the second laminate 1500. Herein, the terminal sheet 1530 includes the third dielectric, the first terminal portion, and the second terminal portion as recited in the claims.

The fourth magnetic sheet 1520 has a fourth radiation line 1522 formed on the outer circumference of one surface thereof or the side surfaces thereof. At this time, the fourth radiation lines 1522 formed on the fourth magnetic sheets 1520 are connected to each other through via holes to form the side winding radiation pattern 1510 winding the side surfaces of the second laminate 1500.

The fourth magnetic sheet 1520 has the connection patterns for connecting both ends of the vertical winding radiation pattern 1410 formed on the first laminate 1400 to the internal terminal of the terminal sheet 1530. That is, the fourth magnetic sheet 1520 has a first connection pattern 1524 connected to one end of the vertical winding radiation pattern 1410 and a second connection pattern 1526 connected to the other end of the vertical winding radiation pattern 1410 formed thereon.

At this time, the first connection pattern 1524 is connected to the first connection patterns 1524 formed on the other fourth magnetic sheets 1520 through a via hole to connect one end of the vertical winding radiation pattern 1410 to a second internal terminal 1532. The second connection pattern 1526 is connected to the second connection patterns 1526 formed on the other fourth magnetic sheets 1520 through a via hole to connect the other end of the vertical winding radiation pattern 1410 to the fourth internal terminal 1534.

The fourth magnetic sheet 1520 has a third connection pattern 1528 for connecting one end of the side winding radiation pattern 1510 to the third internal terminal 1533 formed thereon. That is, the remaining fourth magnetic sheets 1520 except for the sheet stacked on the uppermost portion of a plurality of fourth magnetic sheets 1520 has the third connection pattern 1528 for connecting one end of the side winding radiation pattern 1510 (i.e., the fourth radiation line 1522) to the third internal terminal 1533 formed thereon. Therefore, the side winding radiation pattern 1510 has one end connected to the third internal terminal 1533 formed on the terminal sheet 1530, and has the other end connected to the first internal terminal 1531 formed on the terminal sheet 1530.

The terminal sheet 1530 has two pairs of internal terminals disposed to be spaced apart from each other on one surface thereof. That is, one surface of the terminal sheet 1530 has the first internal terminal 1531 connected to the other end of the side winding radiation pattern 1510, the second internal terminal 1532 connected to one end of the vertical winding radiation pattern 1410, the third internal terminal 1533 connected to one end of the side winding radiation pattern 1510, and a fourth internal terminal 1534 connected to the other end of the vertical winding radiation pattern 1410 disposed to be spaced apart from each other.

The terminal sheet 1530 has two pairs of external terminals connected to two pairs of internal terminals, respectively, disposed to be spaced apart from each other on the other surface thereof. That is, the other surface of the terminal sheet 1530 has a first external terminal 1535 connected to the first internal terminal 1531 through a via hole, a second external terminal 1536 connected to the second internal terminal 1532 through another via hole, a third external terminal 1537 connected to the third internal terminal 1533 via still another via hole, and a fourth external terminal 1538 connected to the fourth internal terminal 1534 via yet another via hole disposed to be spaced apart from each other.

As described above, the antenna module for near field communication is composed of the stacked-type antenna including the vertical winding radiation pattern 1410 and the side winding radiation pattern 1510, as the first laminate 1400 and the second laminate 1500 are stacked thereon.

Therefore, the antenna module for near field communication may implement the vertical winding radiation pattern 1410 and the side winding radiation pattern 1510 by stacking the thin film sheets on which the radiation lines are formed, thereby improving the communication performance for near field communication while minimizing the mounting space when being mounted in a small portable terminal such as a smart watch by minimizing the size thereof.

In addition, the antenna module for near field communication may form the radiation field on the front surface, the side surface, and the rear surface of the portable terminal by the vertical winding radiation pattern 1410 and the side winding radiation pattern 1510, thereby improving the communication characteristics while performing the near field communication in all directions (i.e., the side surface, the front surface, and the rear surface) of the portable terminal.

Meanwhile, referring to FIG. 24, the antenna module for near field communication according to the third embodiment of the present disclosure may also have an auxiliary radiation pattern for reinforcing the radiation field in a front surface or rear surface direction of the portable terminal formed thereon.

That is, the first laminate 1400 may further include a first dielectric sheet 1450 stacked on the upper surface of the first magnetic sheet 1420 and a second dielectric sheet 1460 stacked on the lower surface on the lower surface of the third magnetic sheet 1440. Herein, the first dielectric sheet 1450 and the second dielectric sheet 1460 include different dielectrics and the auxiliary radiation line as recited in the claims.

At this time, the first dielectric sheet 1450 has a plurality of first auxiliary radiation lines 1452 corresponding to the first radiation lines 1422 formed on the first magnetic sheet 1420, respectively, formed to be spaced apart from each other thereon. Both ends of the first auxiliary radiation line formed on the first dielectric sheet 1450 are connected to the first radiation line 1422 through a via hole.

The second dielectric sheet 1460 has a plurality of second auxiliary radiation lines 1462 corresponding to the third radiation lines 1442 formed on the third magnetic sheet 1440, respectively, formed to be spaced apart from each other thereon. Both ends of the second auxiliary radiation line 1462 formed on the second dielectric sheet 1460 are connected to the third radiation line 1442 through a via hole.

At this time, the second dielectric sheet 1460 may have the second connection pattern for connecting one end of the vertical winding radiation pattern 1410 to the first connection pattern, and the third connection pattern for connecting the other end of the vertical winding radiation pattern to one end of the side winding radiation pattern formed thereon.

Therefore, the antenna module for near field communication may form an auxiliary radiation pattern in at least one direction of the upper portion and lower portion directions of the vertical winding radiation pattern, thereby improving the near field communication performance on the front and rear surfaces of the portable terminal by increasing the area (or length) of the vertical winding radiation pattern to reinforce the radiation field formed on the front and rear surfaces of the portable terminal.

As described above, although preferred embodiments according to the present disclosure have been described, it is to be understood that they may be modified into various forms, and various modifications and changes thereof may be embodied by those skilled in the art without departing from the scope of the present disclosure.

The invention claimed is:

1. An antenna module for near field communication mounted in a small portable terminal, comprising:
    a first magnetic member;
    a vertical winding radiation pattern winding the outer circumference of the first magnetic member;
    a second magnetic member stacked on the lower surface of the first magnetic member;
    a horizontal winding radiation pattern formed on one surface of the second magnetic member;
    a dielectric stacked on the lower surface of the second magnetic member; and
    a terminal portion formed on the dielectric to be connected to at least one of the vertical winding radiation pattern and the horizontal winding radiation pattern,
    wherein the vertical winding radiation pattern comprises
    a plurality of first radiation lines formed to be spaced apart from each other on one surface of a first magnetic sheet stacked on the uppermost portion of a plurality of magnetic sheets constituting the first magnetic member;
    a plurality of second radiation lines formed to be spaced apart from each other at both sides of one or more second magnetic sheets stacked on the lower surface of the first magnetic sheet of the plurality of magnetic sheets, and having one end connected to one of the plurality of first radiation lines, respectively; and
    a plurality of third radiation lines formed to be spaced apart from each other on one surface of a third magnetic sheet stacked on the lowermost portion of the plurality of magnetic sheets, having one end connected to the second radiation line formed at one side of the second magnetic sheet, and having the other end connected to another second radiation line formed at the other side of the second magnetic sheet.

2. The antenna module for near field communication of claim 1, further comprising
    another dielectric stacked on the upper surface of the first magnetic member; and
    a plurality of first auxiliary radiation lines formed to be spaced apart from each other on one surface of the another dielectric, and connected to each of the plurality of first radiation lines.

3. The antenna module for near field communication of claim 1, further comprising
    another dielectric stacked on the lower surface of the first magnetic member; and
    a plurality of second auxiliary radiation lines formed to be spaced apart from each other on one surface of the another dielectric, and connected to each of the plurality of third radiation lines.

4. An antenna module for near field communication mounted in a small portable terminal, comprising:
    a first magnetic member;

a vertical winding radiation pattern winding the outer circumference of the first magnetic member;
a second magnetic member stacked on the lower surface of the first magnetic member;
a horizontal winding radiation pattern formed on one surface of the second magnetic member;
a dielectric stacked on the lower surface of the second magnetic member;
a terminal portion formed on the dielectric to be connected to at least one of the vertical winding radiation pattern and the horizontal winding radiation pattern;
a third magnetic member stacked on the upper surface of the first magnetic member; and
a closed loop radiation pattern formed on one surface of the third magnetic member, and having both ends connected to each other,
wherein the vertical winding radiation pattern alternately winds the upper surface and the lower surface of the first magnetic member.

5. An antenna module for near field communication mounted in a small portable terminal, comprising:
a first magnetic member;
a vertical winding radiation pattern winding the outer circumference of the first magnetic member;
a second magnetic member stacked on the lower surface of the first magnetic member;
a horizontal winding radiation pattern formed on one surface of the second magnetic member;
a dielectric stacked on the lower surface of the second magnetic member;
a terminal portion formed on the dielectric to be connected to at least one of the vertical winding radiation pattern and the horizontal winding radiation pattern;
a third magnetic member stacked on the upper surface of the first magnetic member; and
another horizontal winding radiation pattern formed on one surface of the third magnetic member, and having both ends spaced apart from each other,
wherein the vertical winding radiation pattern alternately winds the upper surface and the lower surface of the first magnetic member.

6. The antenna module for near field communication of claim 5,
wherein the terminal portion comprises
a first terminal portion formed on the dielectric to be connected to the other end of the vertical winding radiation pattern;
a second terminal portion formed on the dielectric to be connected to the other end of the horizontal winding radiation pattern;
a third terminal portion formed on the dielectric stacked on the lower surface of the second magnetic member to be connected to one end of the another horizontal winding radiation pattern; and
a fourth terminal portion formed on the dielectric to be connected to the other end of the another horizontal winding radiation pattern.

7. The antenna module for near field communication of claim 6, further comprising a matching circuit connected to the third terminal portion and the fourth terminal portion.

8. An antenna module for near field communication mounted in a small portable terminal, comprising:
a first magnetic member;
a vertical winding radiation pattern winding the outer circumference of the first magnetic member;
a second magnetic member stacked on the lower surface of the first magnetic member;
a side winding radiation pattern winding the side surfaces of the second magnetic member, and having one end connected to one end of the vertical winding radiation pattern;
a dielectric stacked on the lower surface of the second magnetic member; and
a terminal portion formed on the dielectric to be connected to at least one of the vertical winding radiation pattern and the side winding radiation pattern,
wherein the vertical winding radiation pattern alternately winds the upper surface and the lower surface of the first magnetic member.

9. The antenna module for near field communication of claim 8,
wherein the terminal portion comprises
a first terminal portion formed on the dielectric to be connected to the other end of the vertical winding radiation pattern; and
a second terminal portion formed on the dielectric to be connected to the other end of the side winding radiation pattern, and
wherein the side winding radiation pattern has one end connected to one end of the vertical winding radiation pattern.

10. The antenna module for near field communication of claim 8,
wherein the terminal portion comprises
a first terminal portion formed on the dielectric to be connected to one end of the vertical winding radiation pattern;
a second terminal portion formed on the dielectric to be connected to the other end of the vertical winding radiation pattern;
a third terminal portion formed on the dielectric to be connected to one end of the side winding radiation pattern; and
a fourth terminal portion formed on the dielectric to be connected to the other end of the side winding radiation pattern.

11. An antenna module for near field communication mounted in a small portable terminal, comprising:
a first magnetic member;
a vertical winding radiation pattern winding the outer circumference of the first magnetic member;
a second magnetic member stacked on the lower surface of the first magnetic member;
a side winding radiation pattern winding the side surfaces of the second magnetic member, and having one end connected to one end of the vertical winding radiation pattern;
a dielectric stacked on the lower surface of the second magnetic member; and
a terminal portion formed on the dielectric to be connected to at least one of the vertical winding radiation pattern and the side winding radiation pattern,
wherein the vertical winding radiation pattern comprises
a plurality of first radiation lines formed to be spaced apart from each other on one surface of a first magnetic sheet stacked on the uppermost portion of a plurality of magnetic sheets constituting the first magnetic member;
a plurality of second radiation lines formed to be spaced apart from each other at both side surfaces of one or more second magnetic sheets stacked on the lower surface of the first magnetic sheet of the plurality of magnetic sheets, and having one end connected to one of the plurality of first radiation lines, respectively; and a plurality of third radiation lines formed to be spaced apart from each other on one surface of a third magnetic sheet stacked on the lowermost portion of the plurality of magnetic sheets, having one end connected to the second radiation line formed at one side of the second magnetic sheet, and having the other end connected to another second radiation line formed at the other side of the second magnetic sheet.

12. The antenna module for near field communication of claim 11, further comprising
    another dielectric stacked on the upper surface of the first magnetic member; and
    a plurality of first auxiliary radiation lines formed to be spaced apart from each other on one surface of the another dielectric, and connected to each of the plurality of first radiation lines.

13. The antenna module for near field communication of claim 11, further comprising
    another dielectric stacked on the lower surface of the first magnetic member; and
    a plurality of second auxiliary radiation lines formed to be spaced apart from each other on one surface of the another dielectric, and connected to each of the plurality of third radiation lines.

14. The antenna module for near field communication of claim 8,
    wherein the second magnetic member comprises one or more magnetic sheets, and
    wherein the side winding radiation pattern comprises a radiation line winding the side surface of each of the one or more magnetic sheets or the outer circumference of one surface thereof.

15. The antenna module for near field communication of claim 14,
    wherein the one or more magnetic sheets has a connection pattern for connecting the vertical winding radiation pattern to the terminal portion formed thereon.

* * * * *